US011183202B2

(12) United States Patent
Fejgin et al.

(10) Patent No.: US 11,183,202 B2
(45) Date of Patent: Nov. 23, 2021

(54) AUDIO DISCONTINUITY DETECTION AND CORRECTION

(71) Applicant: DOLBY LABORATORIES LICENSING CORPORATION, San Francisco, CA (US)

(72) Inventors: Roy M. Fejgin, San Francisco, CA (US); Freddie Sanchez, Berkeley, CA (US); Vinay Melkote, Bangalore (IN); Michael Ward, Orinda, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 159 days.

(21) Appl. No.: 15/745,824

(22) PCT Filed: Jul. 26, 2016

(86) PCT No.: PCT/US2016/044023
§ 371 (c)(1),
(2) Date: Jan. 18, 2018

(87) PCT Pub. No.: WO2017/019674
PCT Pub. Date: Feb. 2, 2017

(65) Prior Publication Data
US 2018/0218749 A1    Aug. 2, 2018

Related U.S. Application Data

(60) Provisional application No. 62/197,789, filed on Jul. 28, 2015.

(51) Int. Cl.
*G10L 25/48* (2013.01)
*G11B 27/034* (2006.01)
(Continued)

(52) U.S. Cl.
CPC .............. *G10L 25/48* (2013.01); *G10L 25/18* (2013.01); *G11B 27/034* (2013.01);
(Continued)

(58) Field of Classification Search
CPC ....... G10L 25/18; G10L 25/48; G11B 27/034; G11B 27/038; G11B 27/105; G11B 2220/2541
See application file for complete search history.

(56) References Cited

U.S. PATENT DOCUMENTS 5,793,431 A   8/1998  Simon
6,584,273 B1  6/2003  Ashley
(Continued)

FOREIGN PATENT DOCUMENTS

EP   1998333   12/2008
EP   2104103    9/2009

OTHER PUBLICATIONS

Gerzon, M. et al "The MLP Lossless Compression System for PCM Audio" JAES vol. 52 Issue 3, pp. 243-260, Mar. 2004.

*Primary Examiner* — Angela A Armstrong

(57) ABSTRACT

Methods for detecting whether a rendered version of a specified seamless connection ("SSC") at a connection point between two audio segment sequences results in an audible discontinuity, and methods for analyzing at least one SSC between audio segment sequences to determine whether a renderable version of each SSC would have an audible discontinuity at the connection point when rendered, and in appropriate cases, for a SSC having a renderable version which is determined to have an audible discontinuity when rendered, correcting at least one audio segment of at least one segment sequence to be connected in accordance with the SSC in an effort to ensure that rendering of the SSC will result in seamless connection without an audible discontinuity. Other aspects are editing systems configured to imple- (Continued)

ment any of the methods, and storage media and rendering systems which store audio data generated in accordance with any of the methods.

15 Claims, 9 Drawing Sheets

(51) Int. Cl.
    *G11B 27/038*     (2006.01)
    *G11B 27/10*     (2006.01)
    *G10L 25/18*     (2013.01)

(52) U.S. Cl.
    CPC .......... *G11B 27/038* (2013.01); *G11B 27/105* (2013.01); *G11B 2220/2541* (2013.01)

(56) References Cited

U.S. PATENT DOCUMENTS

| | | | |
|---|---|---|---|
| 6,611,212 B1 | 8/2003 | Craven | |
| 7,221,850 B2 | 5/2007 | Keita | |
| 7,471,337 B2 | 12/2008 | Wells | |
| 7,574,102 B2 * | 8/2009 | Kelly | G11B 27/034 386/278 |
| 7,941,030 B2 | 5/2011 | Norihiko | |
| 8,000,585 B2 | 8/2011 | Hiroshi | |
| 8,055,122 B2 | 11/2011 | Hiroshi | |
| 8,059,943 B2 | 11/2011 | Hiroshi | |
| 8,116,614 B2 | 2/2012 | Hiroshi | |
| 8,165,447 B2 | 4/2012 | Hiroshi | |
| 8,904,453 B2 | 12/2014 | Stewart | |
| 9,326,046 B1 * | 4/2016 | Park | G06F 16/9574 |
| 2005/0102049 A1 * | 5/2005 | Smithers | G10H 7/008 700/94 |
| 2006/0245729 A1 | 11/2006 | Masanori | |
| 2009/0110364 A1 | 4/2009 | Manabu | |
| 2014/0293095 A1 * | 10/2014 | Kajimura | H04R 3/00 348/241 |
| 2015/0071463 A1 | 3/2015 | Elina | |
| 2015/0255079 A1 * | 9/2015 | Huang | G10L 19/0017 704/500 |
| 2016/0372095 A1 * | 12/2016 | Lyske | H04H 60/06 |

\* cited by examiner

The player decides at play time whether to connect B->C or B->D

AUDIO DISCONTINUITY DETECTION AND CORRECTION

CROSS-REFERENCE TO RELATED APPLICATION

This application claims priority to U.S. Provisional Patent Application No. 62/197,789, filed on Jul. 28, 2015, which is incorporated herein by reference in its entirety. The subject matter of this application also is related to that of U.S. Provisional Patent Application No. 62/148,835, filed on Apr. 17, 2015, which is incorporated herein by reference in its entirety.

TECHNICAL FIELD

The invention pertains to audio signal processing, and more particularly to encoding, editing, and rendering of audio programs (e.g., bitstreams indicative of audio content of audio/video programs which also include video content). Some embodiments pertain to detection of audible discontinuities at connection points of rendered versions of specified seamless connections, and correction of audio data (e.g., during editing) to ensure that specified seamless connections between segments of the data are renderable seamlessly. In some embodiments, encoded audio data (e.g., Dolby TrueHD encoded audio) streams indicative of corrected audio are generated and stored (e.g., within an MPEG-2 Transport Stream on a Blu-ray Disc).

BACKGROUND

Dolby and Dolby TrueHD, and Atmos are trademarks of Dolby Laboratories Licensing Corporation. Blu-ray Disc is a trademark of the Blu-ray Disc Association. HDMI is a trademark of HDMI Licensing L.L.C.

Embodiments of the invention are useful for encoding, editing, and rendering channels of many types of audio programs (e.g., multichannel audio programs) in many formats. Some such embodiments are useful for encoding, editing, and rendering channels of object-based audio programs having a large number of channels (e.g., object channels and speaker channels).

It is known to employ playback systems (e.g., in movie theaters) to render object based audio programs. Object based audio programs may be indicative of many different audio objects corresponding to images on a screen, dialog, noises, and sound effects that emanate from different places on (or relative to) the screen, as well as background music and ambient effects (which may be indicated by speaker channels of the program) to create the intended overall auditory experience. Accurate playback of such programs requires that sounds be reproduced in a way that corresponds as closely as possible to what is intended by the content creator with respect to audio object size, position, intensity, movement, and depth.

During generation of object based audio programs, it is typically assumed that the loudspeakers to be employed for rendering are located in arbitrary locations in the playback environment; not necessarily in a predetermined arrangement in a (nominally) horizontal plane or in any other predetermined arrangement known at the time of program generation. Typically, metadata included in the program indicates rendering parameters for rendering at least one object of the program at an apparent spatial location or along a trajectory (in a three dimensional volume), e.g., using a three-dimensional array of speakers. For example, an object channel of the program may have corresponding metadata indicating a three-dimensional trajectory of apparent spatial positions at which the object (indicated by the object channel) is to be rendered. The trajectory may include a sequence of "floor" locations (in the plane of a subset of speakers which are assumed to be located on the floor, or in another horizontal plane, of the playback environment), and a sequence of "above-floor" locations (each determined by driving a subset of the speakers which are assumed to be located in at least one other horizontal plane of the playback environment).

Object based audio programs represent a significant improvement in many respects over traditional speaker channel-based audio programs, since speaker-channel based audio is more limited with respect to spatial playback of specific audio objects than is object channel based audio. Speaker channel-based audio programs consist of speaker channels only (not object channels), and each speaker channel typically determines a speaker feed for a specific, individual speaker in a listening environment.

An object-based audio program may include "bed" channels. A bed channel may be an object channel indicative of an object whose position does not change over the relevant time interval (and so is typically rendered using a set of playback system speakers having static speaker locations), or it may be a speaker channel (to be rendered by a specific speaker of a playback system). Bed channels do not have corresponding time varying position metadata (though they may be considered to have time-invariant position metadata).

Professional and consumer-level audio-visual (AV) systems (e.g., the Dolby® Atmos™ system) have been developed to render hybrid audio content of object-based audio programs that include both bed channels and object channels that are not bed channels. Hybrid audio content including both bed channels and object channels that are not bed channels (e.g., Atmos content) is typically transmitted as a combination of coded waveforms and metadata specified at regular intervals of time.

Playback of an object-based audio program over a traditional speaker set-up (e.g., a 7.1-channel playback system) is achieved by rendering channels of the program (including object channels) to a set of speaker feeds. In some embodiments of the invention, the process of rendering object channels (sometimes referred to herein as objects) and other channels of an object-based audio program (or channels of an audio program of another type) comprises in large part (or solely) a conversion of spatial metadata (for the channels to be rendered) at each time instant into a corresponding gain matrix (referred to herein as a "rendering matrix") which represents how much each of the channels (e.g., object channels and speaker channels) contributes to a mix of audio content (at the instant) indicated by the speaker feed for a particular speaker (i.e., the relative weight of each of the channels of the program in the mix indicated by the speaker feed).

Dolby TrueHD is a conventional audio codec format that supports lossless and scalable transmission of audio signals. The source audio is encoded into a hierarchy of substreams of channels, and a selected subset of the substreams (rather than all of the substreams) may be retrieved from the bitstream and decoded, in order to obtain a lower dimensional (downmix) presentation of the spatial scene. Typically, when all the substreams (sometimes referred to herein collectively as a "top" substream) are decoded and rendered, the resultant audio is identical to the source audio (i.e., the encoding, followed by the decoding, is lossless).

In a commercially available version of Dolby TrueHD, the source audio is typically a 7.1-channel mix (or a set of object channels) which is encoded into a sequence of three substreams, including a first substream which can be decoded to determine a two channel downmix of the original audio (e.g., 7.1-channel original audio). The first two substreams may be decoded to determine a 5.1-channel downmix of the original audio. All three substreams (i.e., a top substream of the encoded bitstream) may be decoded to determine the original audio. Technical details of Dolby TrueHD, and the Meridian Lossless Packing (MLP) technology on which it is based, are well known. Aspects of Dolby TrueHD and MLP technology are described in U.S. Pat. No. 6,611,212, issued Aug. 26, 2003, and assigned to Dolby Laboratories Licensing Corp., and the paper by Gerzon, et al., entitled "The MLP Lossless Compression System for PCM Audio," J. AES, Vol. 52, No. 3, pp. 243-260 (March 2004).

Dolby TrueHD supports specification of downmix matrices. In typical use, the content creator of a 7.1 channel audio program specifies a static matrix to downmix the 7.1 channel program to a 5.1 channel mix, and another static matrix to downmix the 5.1 channel downmix to a 2 channel downmix (or the content creator determines a downmix of a set of object channels to a 7.1 channel program, and specifies a static downmix of the 7.1 channel program to a 5.1 channel mix and a static downmix of the 5.1 channel downmix to a 2 channel downmix) Each static downmix matrix may be converted to a sequence of downmix matrices (each matrix in the sequence for downmixing a different interval in the program) in order to achieve clip-protection.

A program encoded in accordance with the Dolby TrueHD format may be indicative of N channels (e.g., N object channels) and optionally also at least one downmix presentation. Each downmix presentation comprises M downmix channels (where, in this context, M is an integer less than N), and its audio content is a mix of audio content of all or some of the content of the N channels. The program (as delivered to a decoder) includes internally coded channels, and metadata indicative of matrix operations to be performed by a decoder on all or some of the internally coded channels. Some such matrix operations are performed by the decoder on all the internally coded channels such that combined operation of both the encoder and decoder implements a multiplication by an N×N rendering matrix on the full set of N channels. Other ones of such matrix operations are performed by the decoder on a subset of the internally coded channels such that combined operation of both the encoder and decoder implements a multiplication by an M×N rendering matrix, where M is less than N, and N is the number of channels in the full set of input channels, on the original N input channels.

Herein, a "connection" denotes the joining of two (possibly independently encoded) bitstreams indicative of audio content (and optionally also video content), or a time segment (typically, a time segment of very short duration) of the joined (i.e., combined) bitstream at which such joining occurs. A "connection point" herein denotes a time segment (e.g., a time segment of very short duration) or time of the resulting joined (i.e., combined) bitstream at which such joining occurs. A "seamless connection" herein denotes a connection which is accomplished such that the resulting combined bitstream is continuously renderable (where the rendering may include decoding) without any perceptible pause, or gap, or objectionable artifact (e.g., an objectionable "pop") in the audio output (i.e., the combined bitstream is renderable seamlessly to the listener).

Multiple versions of audio and video content are often created so that different ones of the versions can be selected for presentation. For example, a Blu-ray Disc™ can store different versions ("cuts") of a movie, e.g., an original version and a director's cut. Instead of each version being stored in its entirety (which takes up storage space on the optical disc), unique content is only stored once and segments of stored content are connected (at connection points) at play time to render one of the versions (the user-selected presentation). For example, a director's cut may include additional scenes not present in the original version. During playback, the additional scenes are inserted in the proper places (each commencing at a connection point) to create the director's cut.

Another instance where connections are used is when an audiovisual presentation includes content from different sources. For example, a movie on a Blu-ray Disc and additional streaming content from an online source can be combined at one or more connection points, and the combined content can be presented as an extended version of an original film.

Herein, data (including data indicative of audio and video content) having format which complies with the conventional Blu-ray Disc specification may sometimes be referred to as "Blu-ray Disc" data or data in "Blu-ray Disc format," and a disc on which such data is stored may be referred to as a "Blu-ray Disc".

For a connection (between bitstreams indicative of audio content (e.g., encoded audio content), or audio and video content (e.g., encoded audio content and video content)) to be seamless, it must meet certain conditions based on the encoding format and/or delivery method. For example, for a connection between Dolby TrueHD streams stored in Blu-ray Disc format on a Blu-ray Disc to be seamless, there are required conditions that are specific to the Blu-ray Disc specification and there are required conditions that are specific to Dolby TrueHD codec.

Seamless connections require special handling (in comparison with other types of connections) to ensure that the content is processed seamlessly. To properly implement a seamless connection, a system must determine which audio frames (from each of the input bitstreams to be connected to generate a joined bitstream) to present for processing, and then present them for processing. The processing may include decoding of the presented audio frames, and/or processing of the joined bitstream for output (e.g., encoding of a Dolby TrueHD bitstream as a Dolby MAT (Metadata-enhanced Audio Transmission) bitstream for output, e.g., over an HDMI interface or other digital audio interface).

In some seamless connection workflows, there is a need to connect two clips, one from each different version of a movie (e.g., a clip from a Standard version connection to a clip from a Director's cut). The connection point is at an identical video timecode location in each version. However, despite having the same video timecode location (which should guarantee perfect audio/video sync), the actual audio samples in each version may not be perfectly sample aligned (i.e., there may be a sub-frame A/V sync error in one of the versions). This results in an audible pop (glitch) when the connected clips are rendered.

The error can be as much as +/− one video frame's worth of audio. Any A/V sync error that is greater than that can be typically be detected during a quality control operation. With an A/V sync error of not more than +/− one video frame's worth of audio, the audio still appears to be in sync, but it may be possible to hear an objectionable "pop" at the connection point (because the audio connection is not truly seamless).

In some embodiments of the present invention, the audio (or audio and video) content of the bitstreams to be connected (at a seamless connection point) is not in Blu-ray Disc format (e.g., it may be in other optical disc formats, or formats based on solid-state memory cards or other storage media types) but in typical embodiments the bitstreams to be connected (at a seamless connection point) are in Blu-ray Disc format. The Blu-ray Disc format requires that there is no gap in audio data at a seamless connection point. Thus, when mastering a Blu-ray Disc to include audio data segments which are stored separately on the disc and which may be connected at a seamless connection point during playback/rendering, it is not known in advance to the editor whether the playback at the connection point will be from the first audio frame (e.g., access unit) of the second segment (i.e., from access unit B of the first segment to access unit C of the second segment, in the below-defined nomenclature) or from the second audio frame of the second segment (i.e., from access unit B of the first segment to access unit D of the second segment, in the below-defined nomenclature). As will be clear from the description below, when bitstreams to be connected (at a seamless connection point) are in Blu-ray Disc format, typical embodiments of the invention are especially useful during editing of the bitstreams' audio content (e.g., during mastering of a Blu-ray Disc to include the content) to ensure seamless connections during playback/rendering of the edited content.

Thus, we next describe in more detail relevant aspects of conventional Blu-ray Disc format which define how audio and video data are stored on a Blu-ray Disc, how to prepare content (during playback/rendering) with connections, and how the connections are indicated to a Blu-ray Disc player using PlayLists to organize and control the playback of audio and video data.

All Blu-ray Disc titles contain at least one PlayList. Each PlayList is constructed from one or more PlayItems, with each PlayItem referring to a section of audio and video content known as a Clip. The audio and video data for each Clip is stored on the disc as an MPEG-2 transport stream file. FIG. 1 is a diagram of a PlayList including two PlayItems, showing a Clip which is referred to by the first of the PlayItems ("PlayItem1") and a Clip which is referred to by the second one of the PlayItems ("PlayItem2").

More specifically, the following terminology pertains to data stored (in a non-transitory manner) on a disc in the Blu-ray Disc format:

a "Clip" is an MPEG-2 transport stream file (.m2ts) containing multiplexed audio and video elementary streams, together with an associated attributes file (.clpi) describing the contents of the transport stream;

a "PlayItem" is indicative of a Clip or a sequence of Clips. To include a Clip in a PlayList, a PlayItem that refers to the Clip is created and added to the PlayList. A PlayItem contains parameters that specify how each Clip (indicated by the PlayItem) is to be played back (e.g., parameters indicative of start and stop times). The same Clip can be referred to by multiple PlayItems; and a "PlayList" is a collection of PlayItems. The PlayList determines the order in which Clips indicated by the PlayItems are to be played back from the Blu-ray Disc. The same Clip can be used as a component of multiple PlayLists.

A transition between PlayItems of a PlayList (an example of a "connection") always occurs at a video frame boundary. Due to the noninteger relationship between video and audio frame durations, there is nearly always an offset between the end of the video data of a PlayItem and the end of the audio data of the PlayItem. The Blu-ray Disc specification defines methods for ensuring that audio data is correctly managed at each connection point.

When a PlayList contains multiple PlayItems, the "connection_condition" parameter in a PlayItem indicates to the player how the preceding PlayItem connects to it. Three connection types are defined in the Blu-ray Disc specification: not seamless (connection_condition=1), seamless (connection_condition=5), and seamless concatenated (connection_condition=6).

We next describe (with reference to FIG. 2) an example in which two versions of a movie (an original cut and a director's cut) are stored on a Blu-ray Disc. In this example, two PlayLists are created: PlayList 1 (for the original cut); and PlayList 2 (for the director's cut). The PlayItems that make up both PlayLists reference the same Clips up to the point where additional content (not included in the original cut) begins. The next PlayItem in the director's cut PlayList (identified as "PlayItem C" of PlayList 2 in FIG. 2) references a Clip (identified as "Clip 3" in FIG. 2) containing the first additional content, whereas the original cut PlayList (PlayList 1) continues with a PlayItem (PlayItem B of PlayList 1 of FIG. 2) that references the Clips (including "Clip 2" of FIG. 2) containing the next scene of the original cut. To ensure that the transitions to and from the additional content (e.g., a transition to the additional content and a transition from the additional content back to content of the original cut) are not noticeable to the user, seamless connections are specified at the connection points, as indicated in FIG. 2.

Specifying a seamless connection between two PlayItems includes provision of data in at least one of the PlayItems (e.g., in PlayItem A or PlayItem B of PlayList 1 of FIG. 2, or in PlayItem C or PlayItem B of PlayList 2 of FIG. 2) which informs the player that special handling is required. Seamless connections are used when a transition between two PlayItems needs to occur without interruption in audio or video output (e.g., when the content in the later PlayItem in the sequence is intended to be a continuation of the content in the earlier PlayItem). For a system to be able to continue playback seamlessly, the Blu-ray Disc specification imposes a number of constraints on the configuration of the bitstream indicated by each PlayItem. For example, the audio channel configuration of the bitstream of each PlayItem must be identical. The bitstream constraints also ensure that the audio decoder and audio system of the Blu-ray Disc player (and any devices connected downstream of the player via digital audio interface) do not have to be reset after the connection.

To implement a seamless connection, a Blu-ray Disc player needs to determine which audio frames to process. Depending on the player's operating mode, the audio frames may be sent to the decoder subsystem of the player, or sent for further processing for bitstream pass-through (e.g., to a Dolby MAT encoder, to implement HDMI output of Dolby TrueHD content of the bitstream having the seamless connection), or both. Regardless of the output method, the player should deliver the same audio frames (to the decoder subsystem of the player and/or to the processor which generates the bitstream to be output from the player). Sending the same audio frames to both the decoder, and the processor which generates the output bitstream, ensures consistent, seamless playback in both the player and an external audio/video receiver.

The Blu-ray Disc specification requires that an overlap of audio data be present at a seamless connection point (e.g., a transition between two PlayItems). The duration of the audio overlap can be anywhere from zero audio frames to just under two audio frames (i.e., 0≤audio overlap<2). The zero overlap case refers to the rare case when a video frame ends at the exact same time as the audio frame of a PlayItem. The zero overlap case is rare for non-integer video frame rates (e.g., 23.976 or 29.97 fps) but is common for integer frame rates (e.g., 24 or 25 fps) due to the duration of each Dolby TrueHD access unit.

The audio data contained in the overlapped segment (e.g., frame or frames) of one of the bitstreams to be connected may or may not be identical to the audio contained in the overlapped segment (e.g., frame or frames) of the other one of the bitstreams to be connected. Because the audio overlap between PlayItems (to be referred to as "PlayItem A" and "PlayItem B") at a seamless connection can be up to two audio frames, the player needs to determine which of two audio frames, both at the end of PlayItem A and the beginning of PlayItem B, to deliver for processing in order to ensure that playback is seamless across the connection point.

FIG. 3 shows a connection point at which a seamless connection between two PlayItems ("PlayItem A" and "PlayItem B") in a PlayList is to be implemented. The audio frames of PlayItem A that must be evaluated to implement the connection are identified as AF[m−1] and AF[m], the audio frames of PlayItem B that must be evaluated to implement the connection are identified as AF[n] and AF[n+1], and the shaded area "AO" indicates the segment of audio overlap.

Because audio frames AF[m−1] and AF[m] (the last two audio frames of the "from" PlayItem) and audio frames AF[n], and AF[n+1] (the first two audio frames of the "to" PlayItem) are the closest audio frames to the connection point of FIG. 3, whether and when each of those frames is presented (e.g., to a decoder) for processing affects the seamlessness of the decoding and/or rendering at the connection point. It may be difficult to determine where the audio transition should actually occur. In the FIG. 3 example, the logical possibilities for the audio transition include:

transition from the end of AF[m−1] to the beginning of AF[n];
transition from the end of AF[m−1] to the beginning of AF[n+1];
transition from the end of AF[m] to the beginning of AF[n]; and
transition from the end of AF[m] to the beginning of AF[n+1].

Depending on which audio transition is chosen, there could be an excess or a shortage of audio available for processing, both of which would cause a loss of synchronization between the audio and video. Because of the various possibilities and the important role that each of the four audio frames (AF[m−1], AF[m], AF[n], and AF[n+1]) plays at the connection, special attention should be paid to these frames.

In addition to audio and video synchronization issues, because there is ambiguity as to which audio frame(s) to process at the transition, there are also potential issues for time-domain codecs (e.g., the Dolby TrueHD codec) which must be addressed to implement a seamless connection. Since there are multiple audio frame transition possibilities, some transition combinations may result in non-continuous audio, i.e., audio containing an audible discontinuity in cases where the connection occurs in a period that is not relatively silent, or where the audio is simply not identical or time-aligned.

Because the transitions between Blu-ray Disc PlayItems (e.g., "PlayItem A" and "PlayItem B" of FIGS. 3 and 4) always occur at a video frame boundary, a Blu-ray Disc player must consider the end time ("OUT_TIMEA") of the last video frame of the earlier PlayItem (PlayItem A) and the start time ("IN_TIMEB") of the next video frame (the first video frame of PlayItem B). These times (OUT_TIMEA and IN_TIMEB) are indicated in FIG. 4. The PlayList contains the values OUT_TIMEA and IN_TIMEB.

The values of the times OUT_TIMEA and IN_TIMEB are in units of a 45 kHz clock, but presentation time stamp (PTS) values of MPEG-2 PES packets within each Clip are in units of a 90 kHz clock. The relationships between the values, OUT_TIMEA and IN_TIMEB, and the corresponding PTS values, PTS[OUT_TIMEA] and PTS[IN_TIMEB], respectively, are:

$$PTS[OUT\_TIMEA]=2 \cdot OUT\_TIMEA; \text{ and}$$

$$PTS[IN\_TIMEB]=2 \cdot IN\_TIMEB$$

In typical operation (to be described with reference to FIG. 4), for each connection point between a first audio/video segment (to be referred to as PlayItemA) and a second audio/video segment (to be referred to as PlayItemB), a Blu-ray Disc player determines which audio frames at the connection point should be delivered for processing (i.e., processing to implement a seamless connection at the connection point), where the last two audio frames of PlayItemA are referred to as frames $AF_{m-1}$ and $AF_m$, and the first two audio frames of PlayItemB are referred to as frames $AF_n$ and $AF_{n+1}$. In such operation, OUT_TIMEA and IN_TIMEB correspond to the same instant of time, since it is assumed that the video frames of PlayItem A and PlayItem B are sequential (i.e., when the last video frame of PlayItem A before the connection point ends, the first video frame of PlayItem B after the connection point begins). However, because each PlayItem may follow a different time scale, the numeric PTS value of OUT_TIMEA ("PTS[OUT_TIMEA]") and the numeric PTS value of IN_TIMEB ("PTS[IN_TIMEB]") may be different.

The player may determine the difference between PTS [OUT_TIMEA] and the PTS value of each the last two audio frames of PlayItem A, and the difference between PTS [IN_TIMEB] and the PTS value of each of the first two audio frames of PlayItem B:

$$A_i = PTS[OUT\_TIMEA] - PTS[AF_i]; \text{ and}$$

$$B_i = PTS[IN\_TIMEB] - PTS[AF_i].$$

where index i is m−1 or m for PlayItem A, and index i is n or n+1 for PlayItem B.

The player typically also:

(a) evaluates audio frames $AF_{m-1}$ and $AF_m$ of PlayItem A, to determine $A_i = PTS[OUT\_TIMEA] - PTS[AF_i]$, for each of i=m−1 and i=m, and if $A_i > 0$, delivers the audio frame $AF_i$ for processing; and (b) evaluates audio frames $AF_n$ and $AF_{n+1}$ of PlayItem B, to determine $B_i = PTS[IN\_TIMEB] - PTS[AF_i]$, for each of i=n and i=n+1, and if $B_i < A_j$, delivers the audio frame $AF_i$ for processing. In step (b), the value $A_j$ is $A_j = PTS[OUT\_TIMEA] - PTS[AF_j]$, where j is the index (either j=m or j=m−1) of the last audio frame of PlayItemA which is delivered. Typically, j=m, so that $A_j = A_m$.

In order to ensure that the audio and video remain synchronized at a connection, a Blu-ray Disc player typically processes audio frames (at a connection point) which have been delivered for processing, only when they will not accumulate an abundance of excess audio. "Excess audio" here denotes the amount of processed audio that extends past the connection point for PlayItem A and/or before the connection point for PlayItem B. Such operation will be described with reference to FIG. 5, which shows the same PlayItems (PlayItem A and PlayItem B) and the same connection point shown in FIGS. 3 and 4.

The duration of an audio frame (e.g., an audio frame of PlayItem A or PlayItem B) is the length of the audio frame in PTS ticks. The duration is constant for each codec. For example, the duration is equal to 75 PTS ticks for Dolby TrueHD (for one access unit) and 2,880 PTS ticks for Dolby Digital (for one sync frame). The excess audio of audio frames $AF_m$ and $AF_n$ of FIG. 5 is given by:

$$\text{excess\_audio}[m] = \text{duration}[m] - A_m; \text{ and}$$

$$\text{excess\_audio}[n] = B_n,$$

where excess_audio[m] is the excess audio of frame $AF_m$, excess_audio[n] is the excess audio of frame $AF_n$ duration [m] is the duration of frame $AF_m$, $A_m = \text{PTS[OUT\_TIMEA]} - \text{PTS}[AF_m]$, and $B_n = \text{PTS [IN\_TIMEB]} - \text{PTS}[AF_n]$.

The excess audio accumulates if not dealt with, and can build up over several connections leading to audio and video synchronization problems. To prevent accumulation of excess audio in accordance with some embodiments, the accumulated excess audio (the accumulation of excess audio at each connection point) is tracked, and when the accumulated excess audio at a connection point would be greater than the duration of an audio frame, the player drops an audio frame at the connection point. The accumulated excess audio is indicated by a variable, total_excess_audio$_c$, which is initialized to 0 at the beginning of playback of the PlayList, and where the index c denotes the codec being analyzed (where the codec "being analyzed" denotes that the audio data in the relevant audio frame has been encoded using the codec). A separate variable total_excess_audio$_c$ is required for each codec being analyzed.

For each codec, the value of total_excess_audio$_c$ is reset to 0 when the user performs an operation that interrupts playback and causes the audio and video buffers to reset, for example, a trick play operation (such as, skipping ahead, rewinding, or fast forwarding). A pause operation may cause this to happen based on the implementation of the player.

In typical operation, a Blu-ray Disc player determines which audio frames, at a connection point between a first audio/video segment (to be referred to as PlayItemA) and a second audio/video segment (to be referred to as PlayItemB), should be processed to implement a seamless connection at the connection point (and processes the audio frames identified for processing), where the last two audio frames of PlayItemA are referred to as frames $AF_{m-1}$ and $AF_m$, and the first two audio frames of PlayItemB are referred to as frames $AF_n$ and $AF_{n+1}$. Such operation includes steps of:

(a) processing audio frame $AF_{m-1}$, and processing audio frame $AF_m$ only if $A_m = \text{PTS[OUT\_TIMEA]} - \text{PTS}[AF_m]$ is greater than 0, and determining an updated excess audio value, "total_excess_audio," where if the audio frame $AF_m$ is not processed, the updated excess audio value is determined to be equal to a predetermined excess audio value, "excess_audio," and if the audio frame $AF_m$ is processed, the updated excess audio value is determined to be equal to total_excess_audio=excess_audio+excess_audio[m], where excess_audio[m] is the amount of excess audio which results from the processing of frame $AF_m$, and excess_audio[m]= duration[m]–$A_m$, where duration[m] is the duration of frame $AF_m$, and $A_m = \text{PTS[OUT\_TIMEA]} - \text{PTS}[AF_m]$;

(b) processing audio frame $AF_{n+1}$;

(c) determining a further updated excess audio value, "new_total_excess_audio," such that new_total_excess_audio=total_excess_audio+excess_audio [n], where excess_audio[n] is the amount of excess audio which would result from processing of frame $AF_n$, and excess_audio[n]=$B_n$=PTS[IN_TIMEB]–PTS[$AF_n$]; and (d) processing audio frame $AF_n$ only if both $B_n < A_m$ and the processing of frame $AF_n$ would not cause the further updated excess audio to exceed the duration of the audio frame $AF_n$, where $B_n = \text{PTS[IN\_TIMEB]} - \text{PTS}[AF_n]$, and $A_m = \text{PTS[OUT\_TIMEA]} - \text{PTS}[AF_m]$ (i.e., only if both $B_n < A_m$ and new_total_excess_audio≤duration[n], where duration[n] is the duration of frame $AF_n$). If processing the audio frame $AF_n$ would not cause the further updated excess audio to exceed the duration of frame $AF_n$, then the audio frame $AF_n$ is processed and the updated excess audio value determined in step (a) is replaced by the further updated excess audio value, new_total_excess_audio=total_ excess_audio+excess_audio[n]. If processing the audio frame $AF_n$ would cause the further updated excess audio to exceed the duration of frame $AF_n$, the frame $AF_n$ is not processed (i.e., the frame $AF_n$ is dropped) and no adjustment is made to the updated excess audio value determined in step (a).

BRIEF DESCRIPTION OF THE INVENTION

Some embodiments of the invention assume that it is intended that a seamless connection may be made at a connection point between a first audio/video segment sequence (e.g., a "PlayItem" as defined in the Blu-ray Disc standard) and a second audio/video segment sequence (e.g., a "PlayItem" as defined in the Blu-ray Disc standard). Typical embodiments analyze, and optionally also correct, audio content (but not video content) of such sequences, and thus the sequences are sometimes referred to as audio segment sequences although they may also include video content. Such an intended seamless connection is referred to herein as a "specified seamless connection" ("SSC"), and it may be specified by metadata corresponding to the audio content of the audio segment sequences. The inventors have recognized that an SSC may not actually be rendered as a seamless connection due to a discontinuity in the audio content of the two sequences at the connection point (i.e., if the sequences have not undergone correction in accordance with an embodiment of the invention), and instead the SSC may be rendered with an audible discontinuity (e.g., a "pop" or other objectionable and audible artifact), sometimes referred to herein as a "glitch" or "audible glitch," at the connection point.

In a first class of embodiments, the invention is a method for detecting whether a rendered version of a specified seamless connection ("SSC") at a connection point, between a first audio segment sequence and a second audio segment sequence, results in an audible discontinuity (e.g., a "pop" or other audible artifact) at the connection point, where an audio segment (a "From" segment, having a first duration) of the first audio segment sequence is followed by (i.e., concatenated with) an audio segment (a "To" segment, having duration at least substantially equal to the first duration) of the second audio segment sequence at the connection point, said method including steps of:

determining a combined segment comprising an end portion of the From segment followed by (i.e., concatenated with) a beginning portion of the To segment, where the combined segment has duration at least substantially equal to the first duration;

determining high-frequency (HF) energy of each of the From segment, the To segment, and the combined segment;

determining a masking value ("PEM") which is at least substantially equal to a greatest one of the HF energy of the From segment, the HF energy of the To segment, and a minimal audible amount of HF energy, and determining a ratio value, R=HEC/PEM, where HEC is the HF energy of the combined segment; and determining that the rendered version of the SSC at the connection point would result in an audible discontinuity if the ratio value, R, exceeds a predetermined threshold value (e.g., R=2.0).

In a second class of embodiments, the invention is a method for analyzing at least one specified seamless connection ("SSC") between audio segment sequences to determine a type of each said SSC, determining whether a rendered version of each said SSC would have an audible discontinuity (sometimes referred to herein as a "glitch" or "audible glitch") at the connection point specified by the SSC, and, for each SSC which has been determined to be of a correctable type and whose rendered version is determined to have an audible discontinuity, correcting (in accordance with the SSC's determined type) at least one uncorrected audio segment of at least one audio segment sequence to be connected in accordance with the SSC, thereby generating at least one corrected audio segment, in an effort to ensure that rendering of the SSC using one said corrected audio segment (in place of the uncorrected audio segment corresponding to the corrected audio segment) will result in seamless connection without an audible discontinuity.

One embodiment in the second class is a method including steps of:

(a) providing data indicative of audio segment sequences and connection metadata for each audio segment sequence in a subset of the audio segment sequences, where the connection metadata for said each segment sequence is indicative of at least one aspect, feature, and/or type of at least one connection to or from the segment sequence, relative to another one of the segment sequences, in a combined sequence which includes at least a portion of the segment sequence;

(b) analyzing at least one specified seamless connection ("SSC"), specified by the connection metadata, between two of the audio segment sequences to determine a type of each said SSC, including by determining whether the SSC is of a correctable type (e.g., when the SSC is at a connection point, determining that the SSC is not of a correctable type upon determining that the set of all specified seamless connection(s) indicated by the connection metadata at the connection point, to or from either one of the two audio segment sequences, is a set of M-to-N specified seamless connections (of a type to be described below), where each of M and N is an integer greater than one), and determining whether each said SSC is renderable as a rendered connection having an audible discontinuity at the connection point specified by the SSC; and (c) for each SSC which has been determined to be of a correctable type and to be renderable as a rendered connection having an audible discontinuity at the connection point specified by the SSC, correcting (in accordance with the SSC's determined type) at least one uncorrected audio segment of at least one audio segment sequence to be connected in accordance with the SSC, thereby generating at least one corrected audio segment, in an effort to ensure that rendering of the SSC using one said corrected audio segment (in place of the uncorrected audio segment corresponding to the corrected audio segment) will result in seamless connection without an audible discontinuity. Typically, each said corrected audio segment is output for storage, and stored in a non-transitory manner (e.g., a conventional, non-transitory manner) in a storage medium (e.g., a disc).

Typically, the connection metadata provided in step (a) are indicative of at least one specified seamless connection (SSC) at a connection point between two of the audio segment sequences, and it is not known (at the time of performance of the method) which of two combined sequences (i.e., which of two different renderable versions of the SSC) will be rendered during rendering of the SSC at the connection point (except in at least one special case in which the method determines that only one of the combined sequences will be rendered, i.e., that there is only one renderable version of the SSC), said combined sequences including:

a first combined sequence including a first one of the segment sequences connected (at the connection point) with a second one of the segment sequences (e.g., where segments A and B are the last two segments of the first one of the segment sequences, segment C is the first segment of the second one of the segment sequences, and segment D is the second segment of the second one of the segment sequences); and a second combined sequence including the first one of the segment sequences connected (at the connection point) with a truncated version of the second one of the segment sequences (e.g., where segments A and B are the last two segments of the first one of the segment sequences, and the second segment, D, of the second one of the segment sequences is the first segment of the truncated version of the second one of the segment sequences).

In some implementations, step (b) includes a step of using at least some of the connection metadata to analyze one said SSC at a connection point between a first one of the segment sequences and a second one of the segment sequences, to determine that rendering of the SSC at the connection point will necessarily result in a rendered version of the SSC in which the last segment of the first one of the segment sequences is connected to the first segment of the second one of the segment sequences, and determining whether the rendered version of the SSC would have an audible discontinuity at the connection point, but omitting a step of determining whether an alternative rendered version of the SSC would have an audible discontinuity at the connection point, where in the alternative rendered version of the SSC the last segment of the first one of the segment sequences is connected, at the connection point, to the second segment of the second one of the segment sequences. Similarly, in some implementations, step (b) includes a step of using at least some of the connection metadata to analyze one said SSC at a connection point between a first one of the segment sequences and a second one of the segment sequences, to determine that rendering of the SSC at the connection point will necessarily result in a rendered version of the SSC in which the last segment of the first one of the segment sequences is connected to the second segment of the second one of the segment sequences, and determining whether the rendered version of the SSC would have an audible discontinuity at the connection point, but omitting a step of determining whether an alternative rendered version of the SSC would have an audible discontinuity at the connection point, where in the alternative rendered version of the SSC the last segment of the first one of the segment sequences is connected, at the connection point, to the first segment of the second one of the segment sequences.

In some implementations of step (b), the step of determining whether each said SSC is renderable as a rendered connection having an audible discontinuity at the connection point specified by the SSC includes performance of the method described above with reference to FIG. 6. For example, some implementations of step (b) employ the method of FIG. 6 for audible discontinuity (glitch) detection for each channel of a pair of multi-channel audio segment sequences to be connected in accordance with the SSC.

In some implementations, step (b) includes a step of analyzing one said SSC at a connection point between a first one of the segment sequences and a second one of the segment sequences, to determine that the set of all specified seamless connection(s) indicated by the connection metadata to or from the first one of the segment sequences or the second one of the segment sequences at the connection point consists of N specified seamless connections to the second one of the audio segment sequences at the connection point, one of the N specified seamless connections is from the first one of the audio segment sequences to the second one of the audio segment sequences, and if N is greater than one, at least one other one of the N specified seamless connections is from a third audio segment sequence to the second one of the audio segment sequences, and step (c) includes a step of correcting the last segment, $B_1$, of the first one of the audio segment sequences by replacing said segment $B_1$ with a corrected segment whose audio content is a crossfade from content of said segment $B_1$ to content of the first segment of the second one of the audio segment sequences, correcting the last segment, $B_2$, of the third audio segment sequence by replacing said segment $B_2$ with a second corrected segment whose audio content is a crossfade from content of said segment $B_2$ to content of the first segment of the second one of the audio segment sequences, and correcting the first segment, C, of the second one of the audio segment sequence by replacing said segment C with a third corrected segment whose audio content is a crossfade from content of the second segment of the second one of the audio segment sequences to content of said segment C.

In some implementations, step (b) includes a step of analyzing one said SSC at a connection point between a first one of the segment sequences and a second one of the segment sequences, to determine that the set of all specified seamless connection(s) indicated by the connection metadata to or from the first one of the segment sequences or the second one of the segment sequences at the connection point consists of N specified seamless connections from the first one of the audio segment sequences at the connection point, one of the N specified seamless connections is from the first one of the audio segment sequences to the second one of the audio segment sequences, and if N is greater than one, at least one other one of the N specified seamless connections is from the first one of the audio segment sequences to a third audio segment sequence, and step (c) includes a step of correcting the first segment, $C_1$, of the second one of the audio segment sequences by replacing said segment $C_1$ with a corrected segment whose audio content is a crossfade, from content of a predicted version of segment $C_1$, which has been predicted (preferably using linear prediction) from the last segment of the first one of the audio segment sequences, to content of said last segment of the first one of the audio segment sequences, correcting the first segment, $C_2$, of the third audio segment sequence by replacing said segment $C_2$ with a corrected segment whose audio content is a crossfade, from content of a predicted version of segment $C_2$, which has been predicted (preferably using linear prediction) from the last segment of the first one of the audio segment sequences, to content of said last segment of the first one of the audio segment sequences, correcting the second segment, $D_1$, of the second one of the audio segment sequences by replacing said segment $D_1$ with a corrected segment whose audio content is a crossfade, from content of a predicted version of the first segment, $C_1$, of the second one of the audio segment sequences, which has been predicted (preferably using linear prediction) from the last segment of the first one of the audio segment sequences, to content of said segment $D_1$, and correcting the second segment, $D_2$, of the third audio segment sequence by replacing said segment $D_2$ with a corrected segment whose audio content is a crossfade, from content of a predicted version of the first segment, $C_2$, of said third audio segment sequence, which has been predicted (preferably using linear prediction) from the last segment of the first one of the audio segment sequences, to content of said segment $D_2$.

In some implementations, step (b) includes a step of analyzing one said SSC at a connection point between a first one of the segment sequences and a second one of the segment sequences, to determine that the set of all specified seamless connection(s) indicated by the connection metadata to or from the first one of the segment sequences or the second one of the segment sequences at the connection point consists of N specified seamless connections from the first one of the audio segment sequences at the connection point, where one of the N specified seamless connections is from the first one of the audio segment sequences to the second one of the audio segment sequences, and if N is greater than one, at least one other one of the N specified seamless connections is from the first one of the audio segment sequences to a third audio segment sequence, and to determine that there is only one renderable version of each of the N specified seamless connections at the connection point, where the renderable version of the SSC to the second one of the segment sequences is to the first segment of said second one of the audio segment sequences, and the renderable version of the SSC to the third audio segment sequence is to the first segment of said third audio segment sequence, and step (c) includes a step of correcting the first segment, $C_1$, of the second one of the audio segment sequences by replacing said segment $C_1$ with a corrected segment whose audio content is a crossfade, from content of a predicted version of segment $C_1$, which has been predicted (preferably using linear prediction) from the last segment of the first one of the audio segment sequences, to content of said segment $C_1$, and correcting the first segment, $C_2$, of the third audio segment sequence by replacing said segment $C_2$ with a corrected segment whose audio content is a crossfade, from content of a predicted version of segment $C_2$, which has been predicted (preferably using linear prediction) from the last segment of the first one of the audio segment sequences, to content of said segment $C_2$.

In some implementations, step (b) includes a step of analyzing one said SSC at a connection point between a first one of the segment sequences and a second one of the segment sequences, to determine that the set of all specified seamless connection(s) indicated by the connection metadata to or from the first one of the segment sequences or the second one of the segment sequences at the connection point consists of N specified seamless connections from the first one of the audio segment sequences at the connection point, where one of the N specified seamless connections is from the first one of the audio segment sequences to the second one of the audio segment sequences, and if N is greater than one, at least one other one of the N specified seamless connections is from the first one of the audio segment sequences to a third audio segment sequence, and to determine that there is only one renderable version of each of the N specified seamless connections at the connection point, where the renderable version of the SSC to the second one of the segment sequences is to the second segment of said second one of the audio segment sequences, and the renderable version of the SSC to the third audio segment sequence is to the second segment of said third audio segment sequence, and step (c) includes a step of correcting the second segment, $D_1$, of the second one of the audio segment sequences by replacing said segment $D_1$ with a corrected segment whose audio content is a crossfade, from content of a predicted version of the first segment, $C_1$, of the second one of the audio segment sequences, which has been predicted (preferably using linear prediction) from the last segment of the first one of the audio segment sequences, to content of said segment $D_1$, and correcting the second segment, $D_2$, of the third audio segment sequence by replacing said segment $D_2$ with a corrected segment whose audio content is a crossfade, from content of a predicted version of the first segment, $C_2$, of said third audio segment sequence, which has been predicted (preferably using linear prediction) from the last segment of the first one of the audio segment sequences, to content of said segment $D_2$.

In some implementations, step (b) includes a step of analyzing one said SSC at a connection point between a first one of the segment sequences and a second one of the segment sequences, to determine that the set of all specified seamless connection(s) indicated by the connection metadata to or from the first one of the segment sequences or the second one of the segment sequences at the connection point consists of N specified seamless connections to the second one of the audio segment sequences at the connection point, where one of the N specified seamless connections is from the first one of the audio segment sequences to the second one of the audio segment sequences, and if N is greater than one, at least one other one of the N specified seamless connections is from a third audio segment sequence to the second one of the audio segment sequences, and to determine that there is only one renderable version of each of the N specified seamless connections at the connection point, where the renderable version of the SSC from the first one of the segment sequences is to the second segment of said second one of the audio segment sequences, and the renderable version of the SSC from the third audio segment sequence is to the second segment of said second one of the audio segment sequences, and step (c) includes a step of correcting the last segment, $B_1$, of the first one of the audio segment sequences by replacing said segment $B_1$ with a corrected segment whose audio content is a crossfade from content of said segment $B_1$ to content of the first segment of the second one of the audio segment sequences, correcting the last segment, $B_2$, of the third audio segment sequence by replacing said segment $B_2$ with a second corrected segment whose audio content is a crossfade from content of said segment $B_2$ to content of the first segment of the second one of the audio segment sequences.

In some implementations, step (b) includes a step of analyzing one said SSC at a connection point between a first one of the segment sequences and a second one of the segment sequences, to determine that the set of all specified seamless connection(s) indicated by the connection metadata to or from the first one of the segment sequences or the second one of the segment sequences at the connection point consists of N specified seamless connections to the second one of the audio segment sequences at the connection point, where one of the N specified seamless connections is from the first one of the audio segment sequences to the second one of the audio segment sequences, and if N is greater than one, at least one other one of the N specified seamless connections is from a third audio segment sequence to the second one of the audio segment sequences, and to determine that there is only one renderable version of each of the N specified seamless connections at the connection point, where the renderable version of the SSC from the first one of the segment sequences is to the first segment of said second one of the audio segment sequences, and the renderable version of the SSC from the third audio segment sequence is to the first segment of said second one of the audio segment sequences, and step (c) includes a step of correcting the last segment, $B_1$, of the first one of the audio segment sequences by replacing said segment $B_1$ with a corrected segment whose audio content is a crossfade from content of said segment $B_1$ to content of a predicted version of segment $B_1$ which has been predicted backwards in time from the first segment of the second one of the audio segment sequences, and correcting the last segment, $B_2$, of the third audio segment sequence by replacing said segment $B_2$ with a corrected segment whose audio content is a crossfade from content of said segment $B_2$ to content of a predicted version of segment $B_2$ which has been predicted backwards in time from the first segment of the second one of the audio segment sequences.

Another exemplary embodiment in the second class is a method including steps of:

(a) providing data indicative of audio segment sequences and connection metadata for each audio segment sequence in a subset of the audio segment sequences, where the connection metadata for said each segment sequence is indicative of at least one aspect, feature, and/or type of at least one connection to or from the segment sequence, relative to another one of the segment sequences, in a combined sequence which includes at least a portion of the segment sequence;

(b) analyzing at least one specified seamless connection ("SSC"), specified by the connection metadata, between two of the audio segment sequences to determine a type of the SSC, and determining whether the SSC is renderable as a rendered connection having an audible discontinuity at the connection point specified by the SSC; and (c) if the SSC is determined to be renderable as a rendered connection having an audible discontinuity at the connection point specified by the SSC, correcting (in accordance with the SSC's determined type) at least one uncorrected audio segment of at least one audio segment sequence to be connected in accordance with the SSC, thereby generating at least one corrected audio segment, in an effort to ensure that rendering of the SSC using one said corrected audio segment (in place of the uncorrected audio segment corresponding to the corrected audio segment) will result in seamless connection without an audible discontinuity.

In some implementations, the SSC analyzed in step (b) is an SSC at a connection point between a first one of the segment sequences and a second one of the segment sequences, and step (c) includes a determination that the set of all specified seamless connection(s) indicated by the connection metadata to or from the first one of the segment sequences or the second one of the segment sequences at the connection point consists of N specified seamless connections to the second one of the audio segment sequences at the connection point, that one of the N specified seamless connections is from the first one of the audio segment sequences to the second one of the audio segment sequences, and that if N is greater than one, at least one other one of the N specified seamless connections is from a third audio segment sequence to the second one of the audio segment sequences, and step (c) includes a step of correcting the last segment, $B_1$, of the first one of the audio segment sequences by replacing said segment $B_1$ with a corrected segment whose audio content is a crossfade from content of said segment $B_1$ to content of the first segment of the second one of the audio segment sequences, correcting the last segment, $B_2$, of the third audio segment sequence by replacing said segment $B_2$ with a second corrected segment whose audio content is a crossfade from content of said segment $B_2$ to content of the first segment of the second one of the audio segment sequences, and correcting the first segment, C, of the second one of the audio segment sequence by replacing said segment C with a third corrected segment whose audio content is a crossfade from content of the second segment of the second one of the audio segment sequences to content of said segment C.

In some implementations, the SSC analyzed in step (b) is an SSC at a connection point between a first one of the segment sequences and a second one of the segment sequences, and step (c) includes a determination that the set of all specified seamless connection(s) indicated by the connection metadata to or from the first one of the segment sequences or the second one of the segment sequences at the connection point consists of N specified seamless connections from the first one of the audio segment sequences at the connection point, that one of the N specified seamless connections is from the first one of the audio segment sequences to the second one of the audio segment sequences, and that if N is greater than one, at least one other one of the N specified seamless connections is from the first one of the audio segment sequences to a third audio segment sequence, and step (c) includes a step of correcting the first segment, $C_1$, of the second one of the audio segment sequences by replacing said segment $C_1$ with a corrected segment whose audio content is a crossfade, from content of a predicted version of segment $C_1$, which has been predicted (preferably using linear prediction) from the last segment of the first one of the audio segment sequences, to content of said last segment of the first one of the audio segment sequences, correcting the first segment, $C_2$, of the third audio segment sequence by replacing said segment $C_2$ with a corrected segment whose audio content is a crossfade, from content of a predicted version of segment $C_2$, which has been predicted (preferably using linear prediction) from the last segment of the first one of the audio segment sequences, to content of said last segment of the first one of the audio segment sequences, correcting the second segment, $D_1$, of the second one of the audio segment sequences by replacing said segment $D_1$ with a corrected segment whose audio content is a crossfade, from content of a predicted version of the first segment, $C_1$, of the second one of the audio segment sequences, which has been predicted (preferably using linear prediction) from the last segment of the first one of the audio segment sequences, to content of said segment $D_1$, and correcting the second segment, $D_2$, of the third audio segment sequence by replacing said segment $D_2$ with a corrected segment whose audio content is a crossfade, from content of a predicted version of the first segment, $C_2$, of said third audio segment sequence, which has been predicted (preferably using linear prediction) from the last segment of the first one of the audio segment sequences, to content of said segment $D_2$.

Aspects of the invention include a system or device (e.g., an editing system or a rendering system) configured (e.g., programmed) to implement any embodiment of the inventive method, a system or device including a memory (e.g., a buffer memory) which stores (e.g., in a non-transitory manner) at least one frame or other segment of corrected audio content generated by any embodiment of the inventive method, and a storage medium (e.g., a disc) which stores code (e.g., in a non-transitory manner) for implementing any embodiment of the inventive method or steps thereof, or which stores s (e.g., in a non-transitory manner) at least one frame or other segment of corrected audio content generated by any embodiment of the inventive method. For example, the inventive system can be or include a programmable general purpose processor, digital signal processor, or microprocessor, programmed with software or firmware and/or otherwise configured to perform any of a variety of operations on data, including an embodiment of the inventive method or steps thereof. Such a general purpose processor may be or include a computer system including an input device, a memory, and processing circuitry programmed (and/or otherwise configured) to perform an embodiment of the inventive method (or steps thereof) in response to data asserted thereto.

Figure 1:
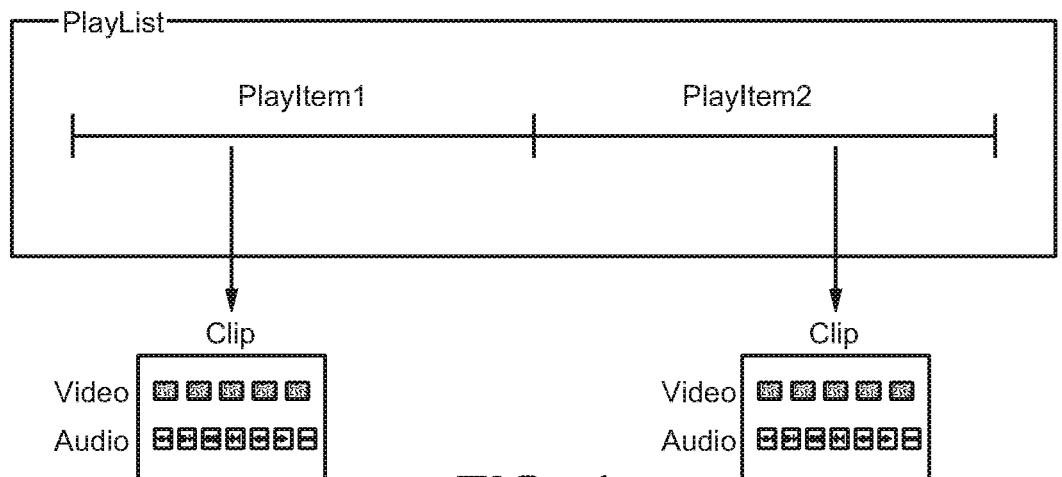
FIG. 1 is a diagram of a PlayList (determined by data in Blu-ray Disc format) including two PlayItems, indicating a Clip referred to by one of the PlayItems ("PlayItem1") and a Clip referred to by another one of the PlayItems ("PlayItem2").
Figure 2:
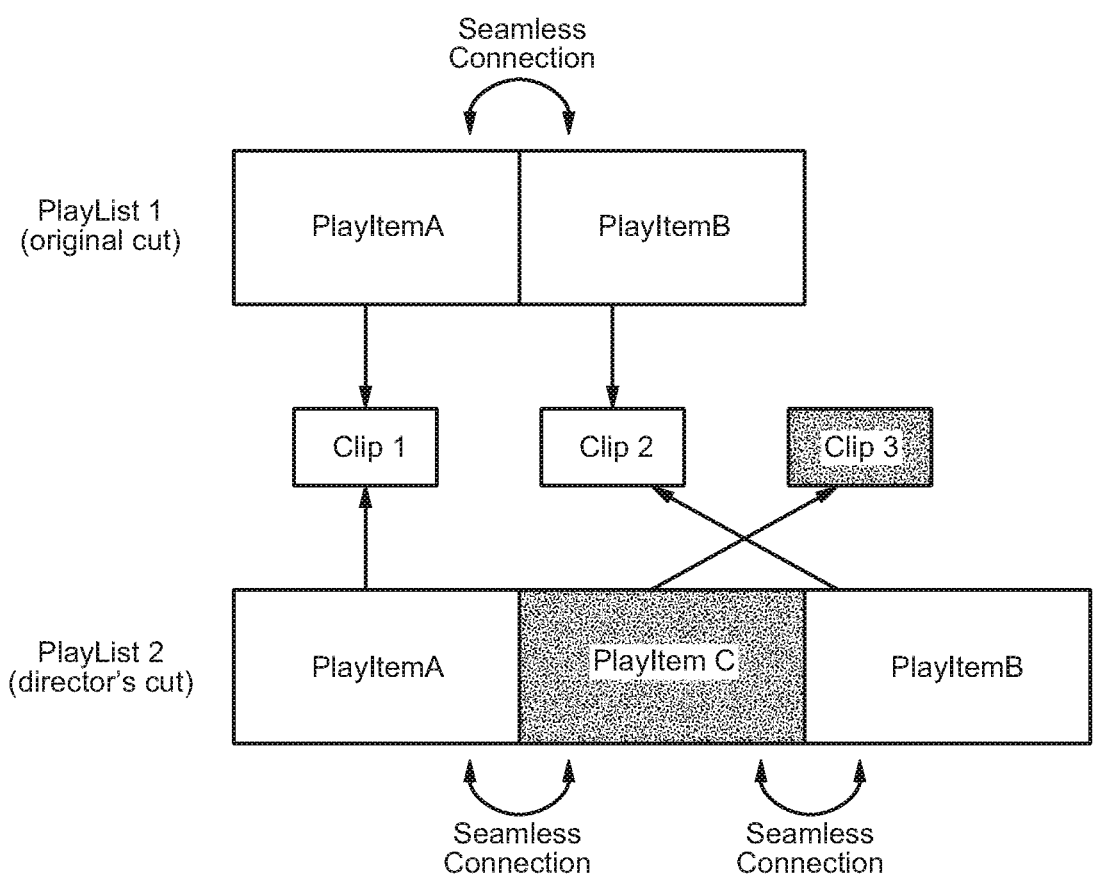
FIG. 2 is a diagram of two PlayLists (in Blu-ray Disc format) indicative of two versions of a movie (an original cut and a director's cut) stored on a Blu-ray Disc.
Figure 3:
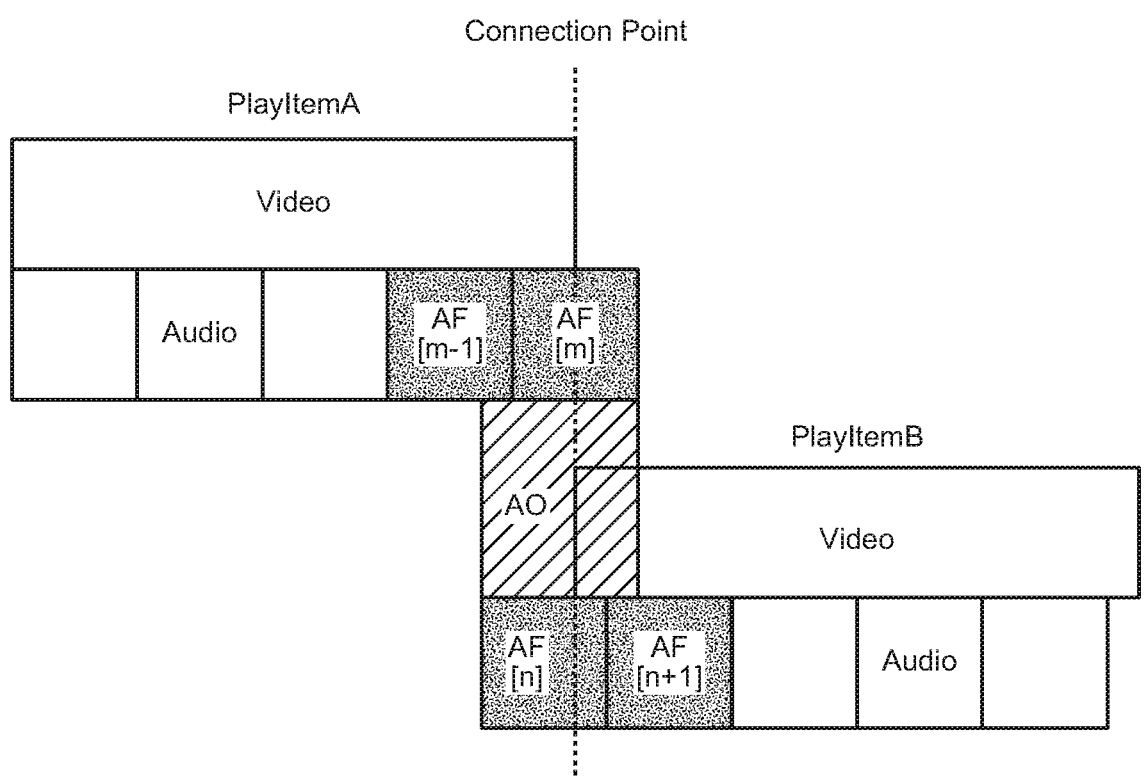
Figure 4:
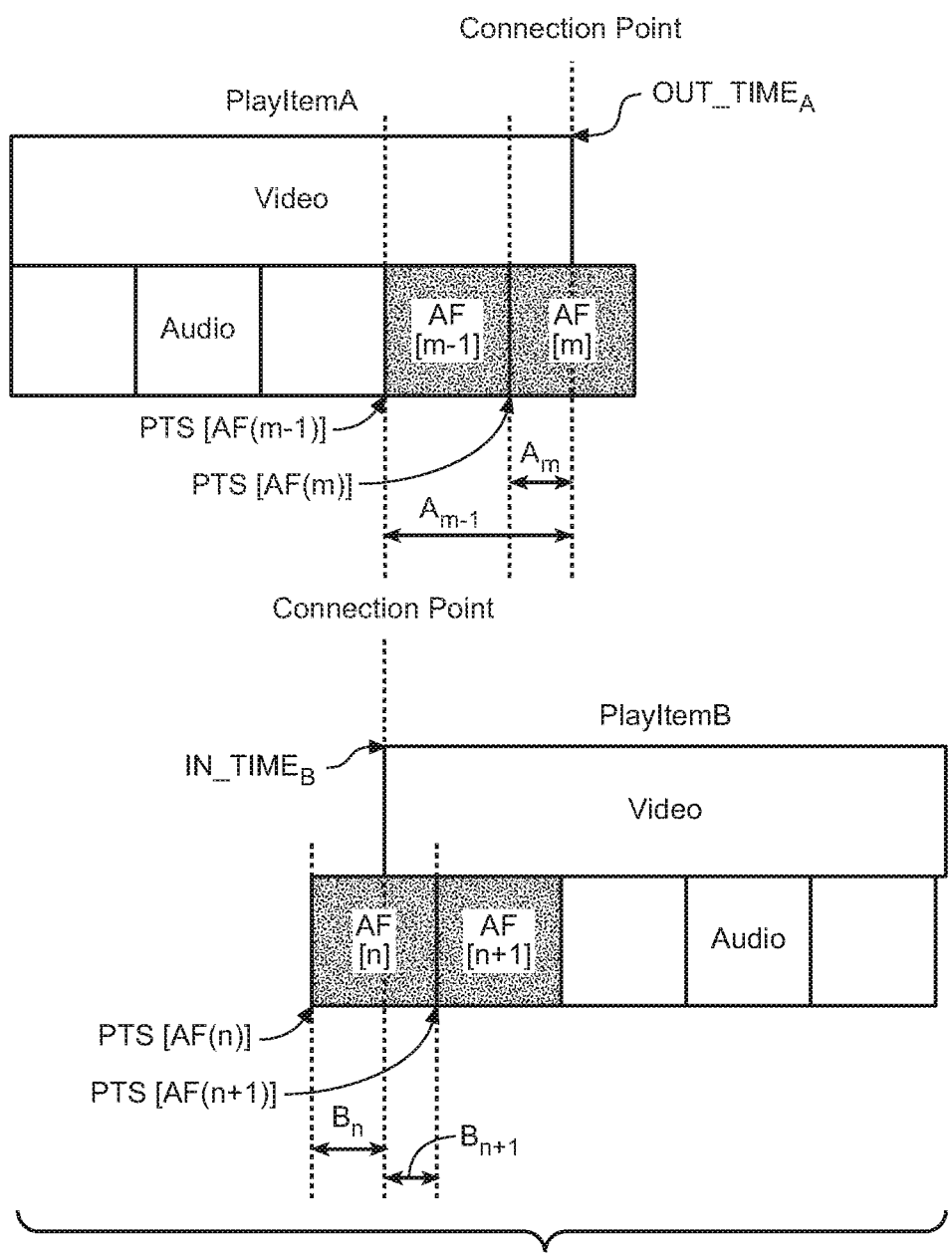
Figure 5:
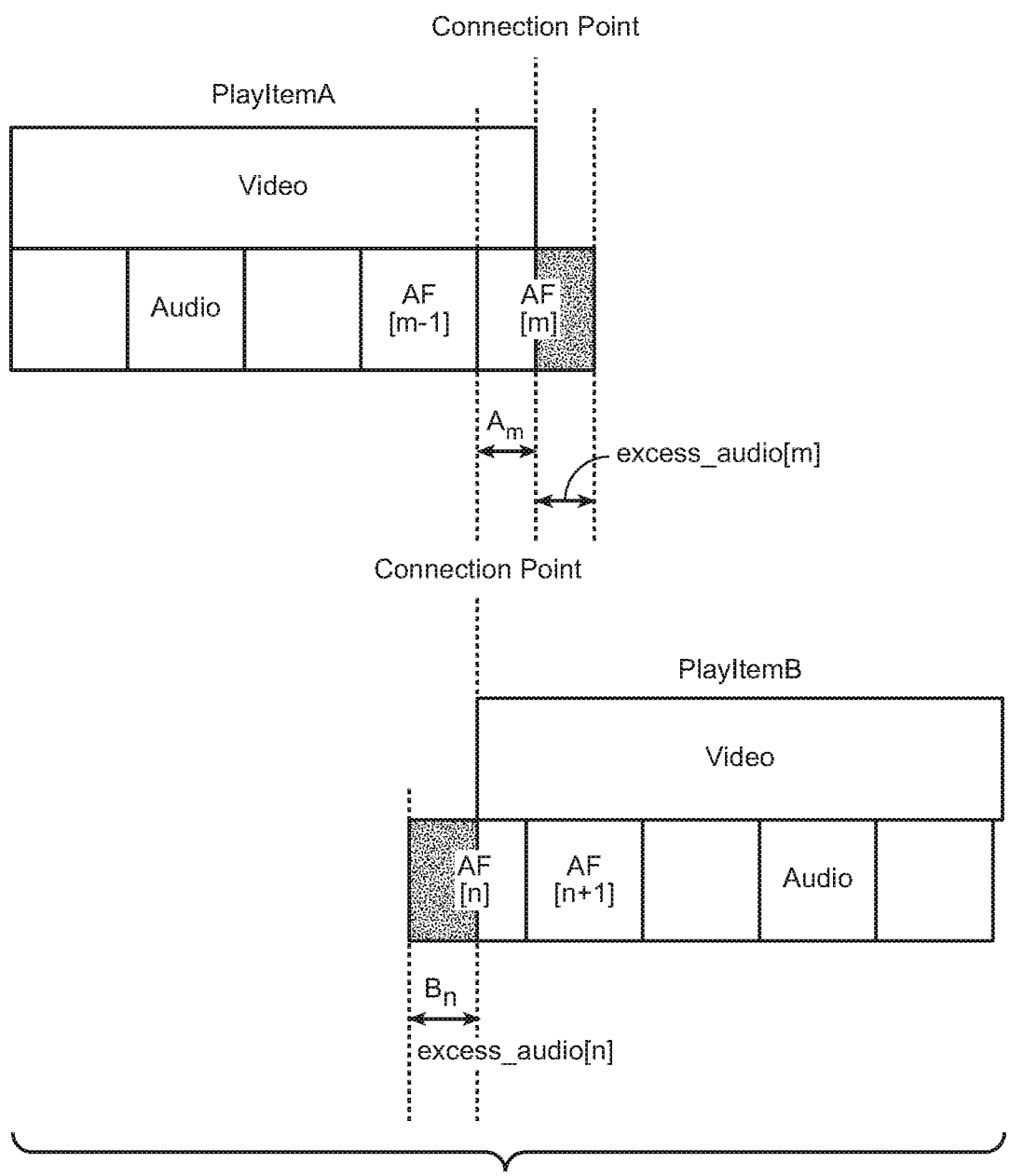

Each of FIGS. 3, 4, and 5 is a diagram of a connection point at which a seamless connection between two PlayItems ("PlayItem A" and "PlayItem B") in a PlayList (determined by data in Blu-ray Disc format) is to be implemented.

Figure 6:
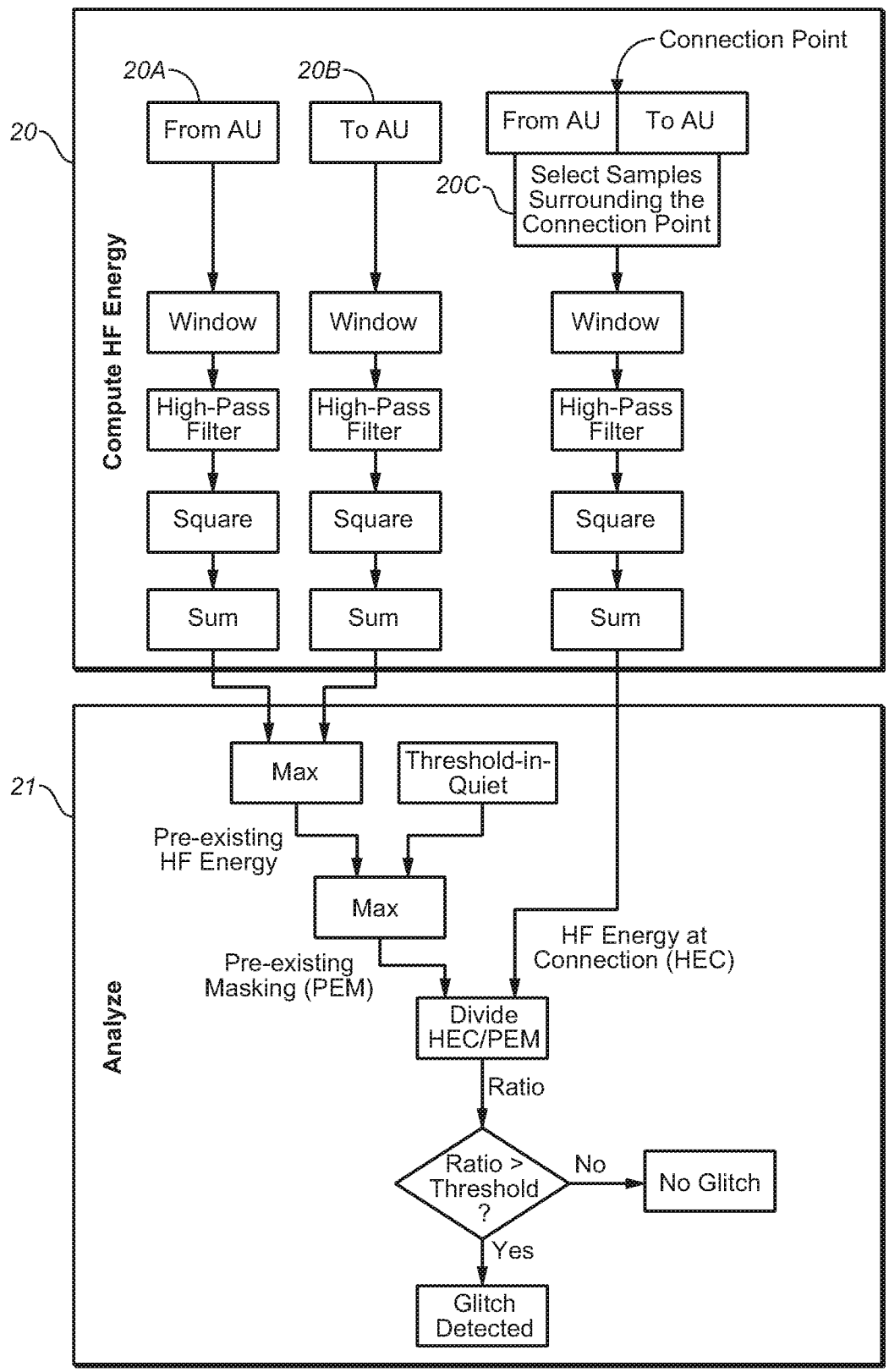

FIG. 6 is a flowchart of steps performed in an embodiment of the inventive method for detecting a discontinuity at a specified connection point.

Figure 7:
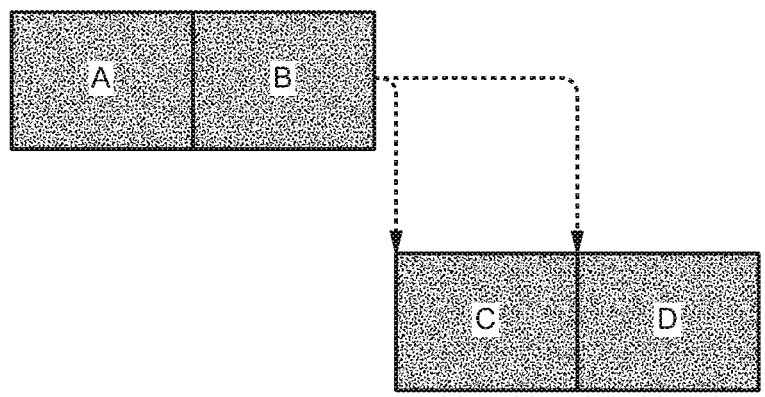

FIG. 7 is a diagram of two connections which may be implemented by a disc player (e.g., a Blu-ray disc player) at a connection point (specified by data stored on a disc) at which two audio segment sequences (also specified by data stored on a disc) are to be connected.

Figure 8:
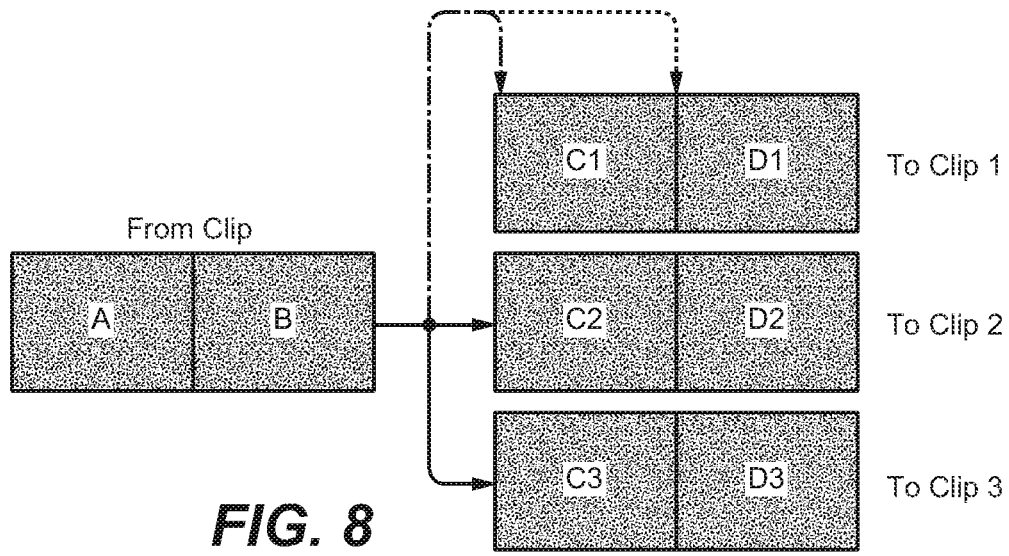

FIG. 8 is a diagram of six connections which may be implemented by a disc player (e.g., a Blu-ray disc player) at a connection point (specified by data stored on a disc), where data stored on the disc also specifies an audio segment sequence (a "from" clip) to be connected to any selected one of three selectable audio segment sequences ("to" clips).

Figure 9:
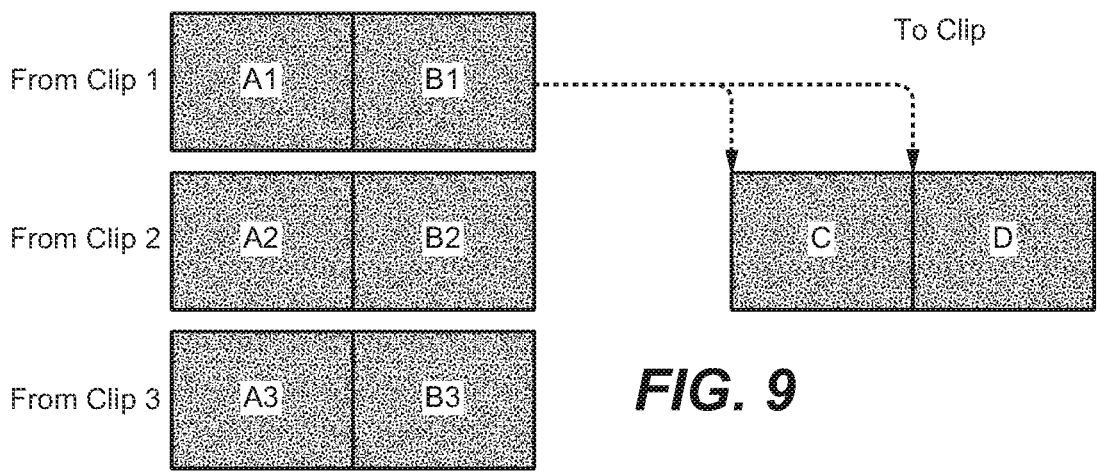

FIG. 9 is a diagram of six connections which may be implemented by a disc player (e.g., a Blu-ray disc player) at a connection point (specified by data stored on a disc), where data stored on the disc also specifies three selectable audio segment sequences ("from" clips), any one of which may be selected for connection to another audio segment sequence (a "to" clip) specified by data stored on the disc.

Figure 10:
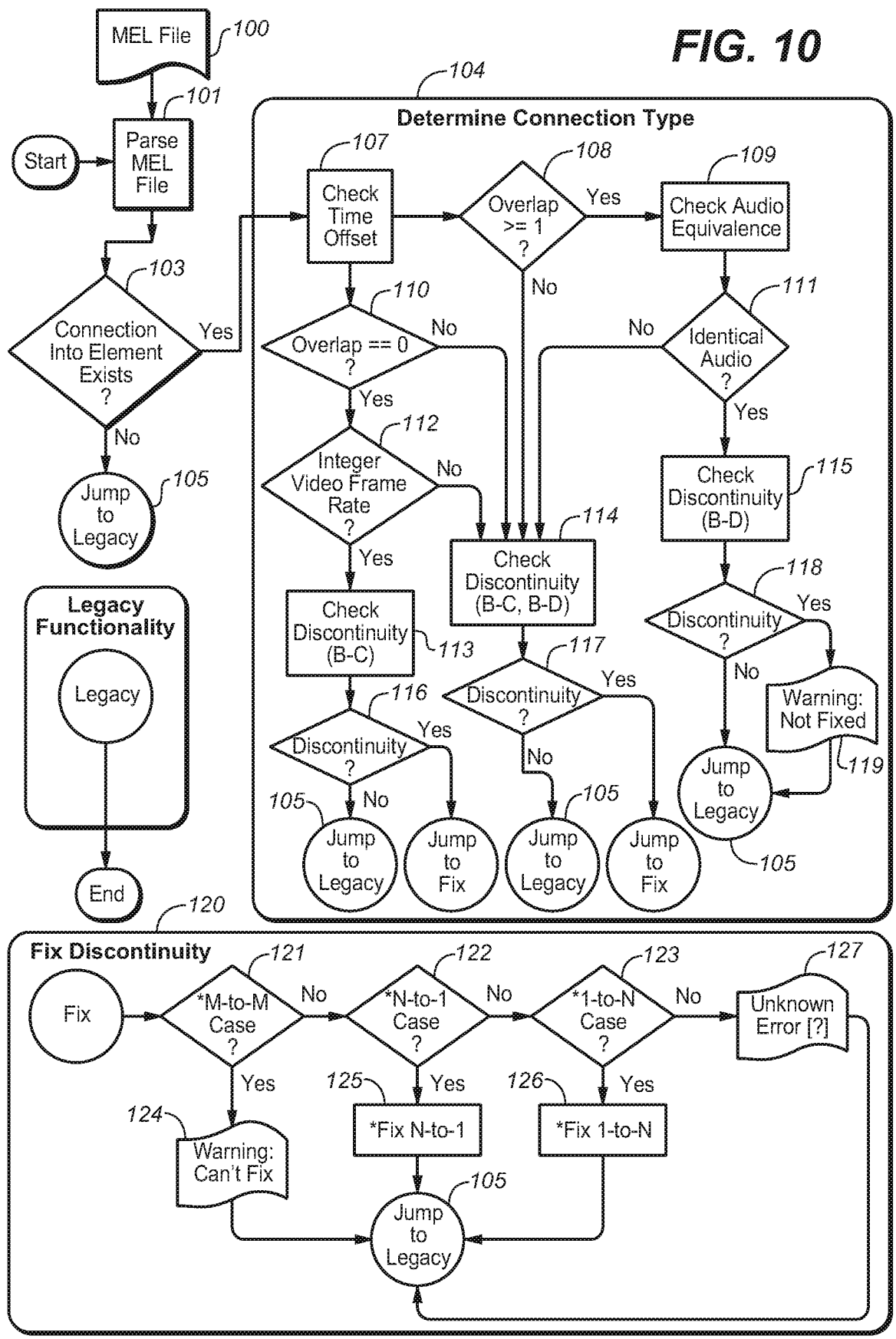

FIG. 10 is a flowchart of steps performed in an embodiment of the inventive method for detecting discontinuities at connection points (at which seamless connections are to be implemented) and correcting audio segments to be connected at such connection points (to ensure implementation of seamless connections).

Figure 11:
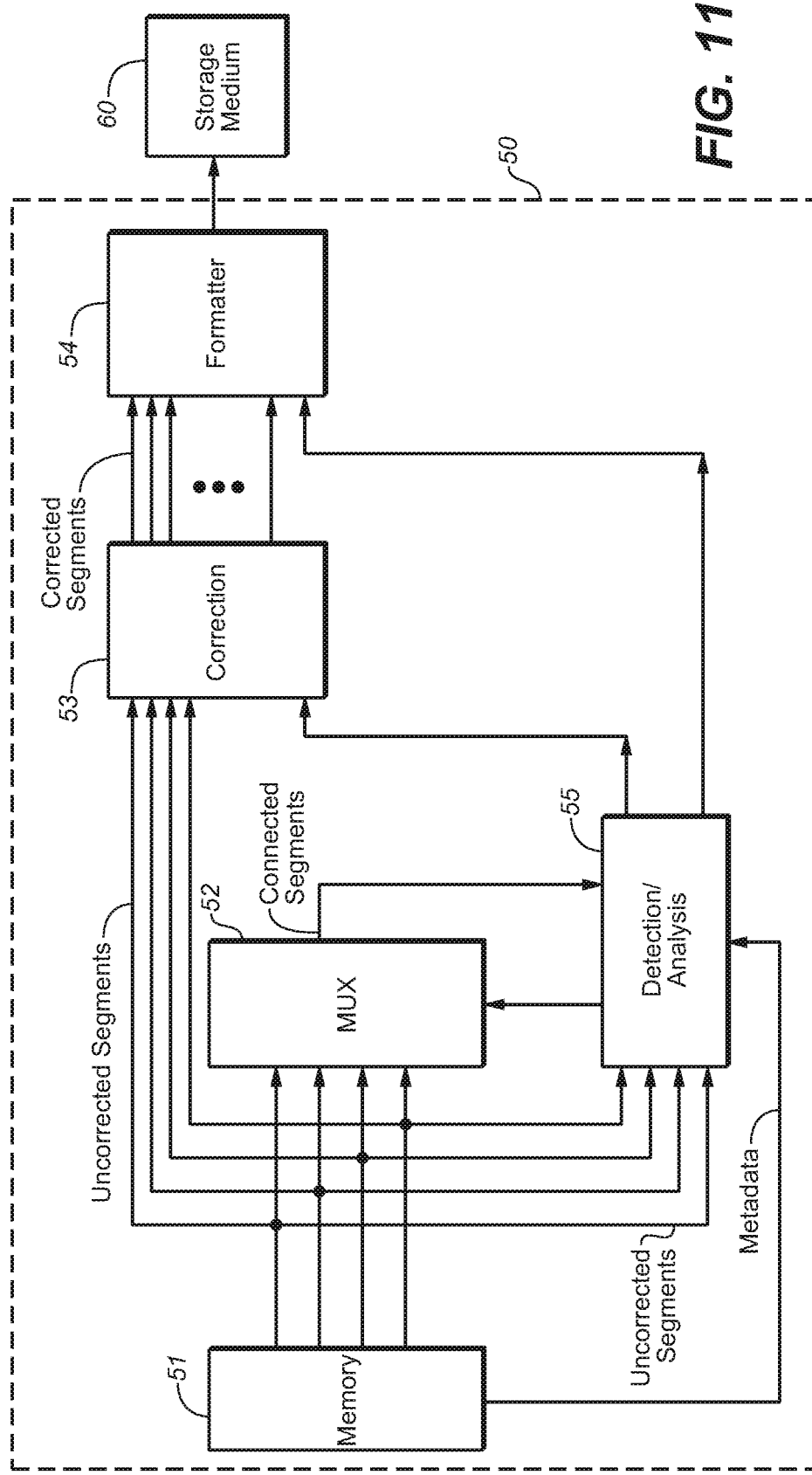

FIG. 11 is a block diagram of elements of an embodiment of the inventive editing system, and a storage medium in which audio content (generated in accordance with an embodiment of the invention) is stored in a non-transitory manner.

Figure 12:
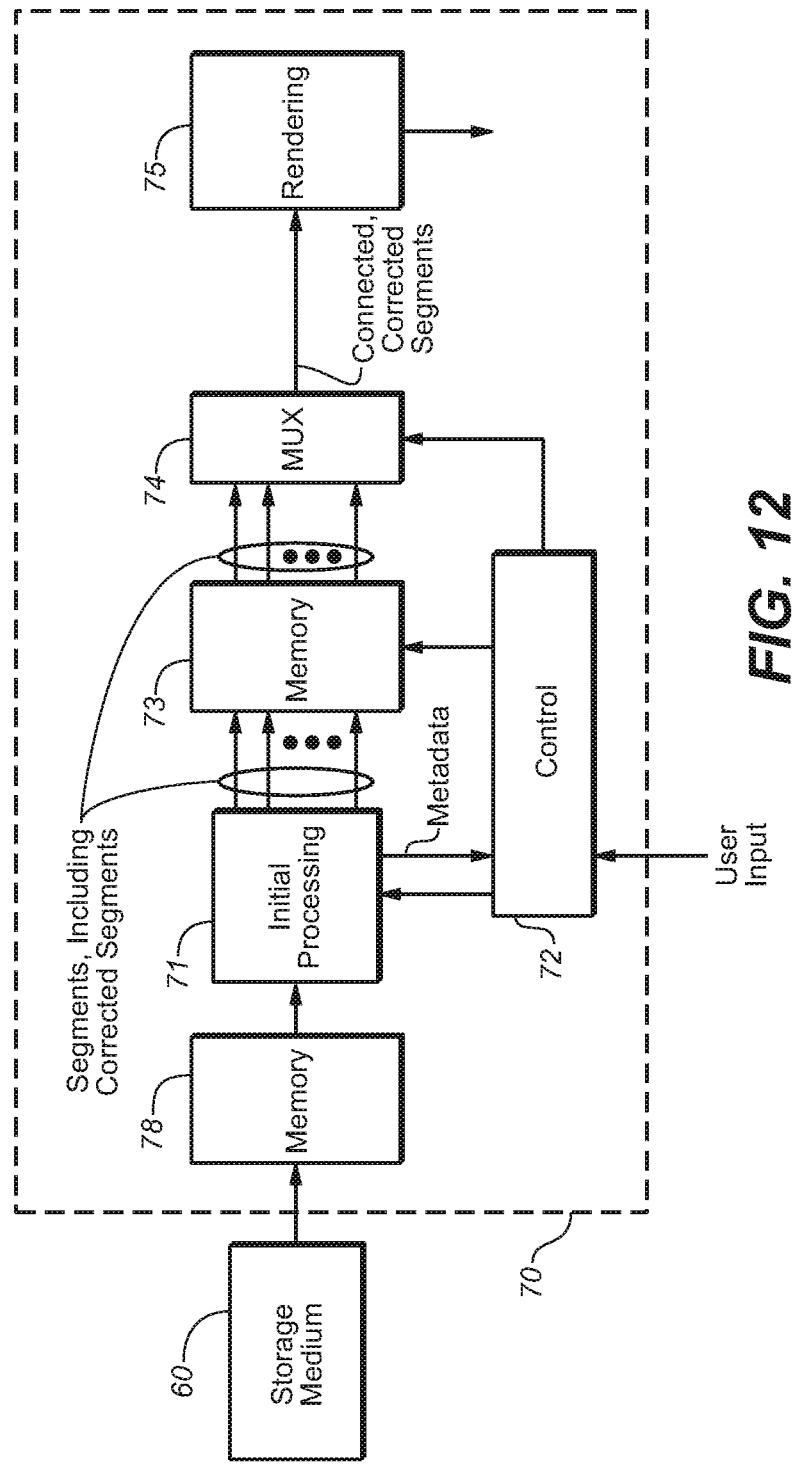

FIG. 12 is a block diagram of a storage medium in which audio content (generated in accordance with an embodiment of the invention) is stored in a non-transitory manner, and elements of an embodiment of the inventive rendering system (including a memory in which audio content, generated in accordance with an embodiment of the invention, is stored in a non-transitory manner).

NOTATION AND NOMENCLATURE

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates Y output signals in response to multiple inputs, in which the subsystem generates M of the inputs and the other Y-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the expression "metadata" refers to separate and different data from corresponding audio data (audio content of a bitstream which also includes metadata). Metadata is associated with audio data, and indicates at least one feature or characteristic of the audio data (e.g., what type(s) of processing have already been performed, or should be performed, on the audio data, or the trajectory of an object indicated by the audio data). The association of the metadata with the audio data is time-synchronous. Thus, present (most recently received or updated) metadata may indicate that the corresponding audio data contemporaneously has an indicated feature and/or comprises the results of an indicated type of audio data processing.

Throughout this disclosure including in the claims, the term "couples" or "coupled" is used to mean either a direct or indirect connection. Thus, if a first device couples to a second device, that connection may be through a direct connection, or through an indirect connection via other devices and connections.

Throughout this disclosure including in the claims, the following expressions have the following definitions:

speaker and loudspeaker are used synonymously to denote any sound-emitting transducer. This definition includes loudspeakers implemented as multiple transducers (e.g., woofer and tweeter);

speaker feed: an audio signal to be applied directly to a loudspeaker, or an audio signal that is to be applied to an amplifier and loudspeaker in series;

channel (or "audio channel"): a monophonic audio signal. Such a signal can typically be rendered in such a way as to be equivalent to application of the signal directly to a loudspeaker at a desired or nominal position. The desired position can be static, as is typically the case with physical loudspeakers, or dynamic;

audio program: a set of one or more audio channels (at least one speaker channel and/or at least one object channel) and optionally also associated metadata (e.g., metadata that describes a desired spatial audio presentation);

speaker channel (or "speaker-feed channel"): an audio channel that is associated with a named loudspeaker (at a desired or nominal position), or with a named speaker zone within a defined speaker configuration. A speaker channel is rendered in such a way as to be equivalent to application of the audio signal directly to the named loudspeaker (at the desired or nominal position) or to a speaker in the named speaker zone;

object channel: an audio channel indicative of sound emitted by an audio source (sometimes referred to as an audio "object"). Typically, an object channel determines a parametric audio source description (e.g., metadata indicative of the parametric audio source description is included in or provided with the object channel). The source description may determine sound emitted by the source (as a function of time), the apparent position (e.g., 3D spatial coordinates) of the source as a function of time, and optionally at least one additional parameter (e.g., apparent source size or width) characterizing the source; and object based audio program: an audio program comprising a set of one or more object channels (and optionally also comprising at least one speaker channel) and optionally also associated metadata (e.g., metadata indicative of a trajectory of an audio object which emits sound indicated by an object channel, or metadata otherwise indicative of a desired spatial audio presentation of sound indicated by an object channel, or metadata indicative of an identification of at least one audio object which is a source of sound indicated by an object channel).

DETAILED DESCRIPTION OF EMBODIMENTS OF THE INVENTION

Examples of embodiments of the invention will be described with reference to FIGS. 6-12.

Some aspects of the invention assume that it is intended that a seamless connection may be made at a connection point between a first audio/video segment sequence (sometimes referred to herein as PlayItemA, though it may or may not be a "PlayItem" as defined in the Blu-ray Disc standard, and sometimes referred to herein as a "first clip" or "from clip") and a second audio/video segment sequence (sometimes referred to herein as PlayItemB, though it may or may not be a "PlayItem" as defined in the Blu-ray Disc standard, and sometimes referred to herein as a "second clip" or "to clip"). Such an intended seamless connection may be a "specified seamless connection" ("SSC") which is specified by metadata (corresponding to the audio content). Some embodiments are methods for detecting whether rendering of an uncorrected version of the connection (e.g., rendering of a simple concatenation of audio content of the two audio/video segment sequences) at the connection point would (or would not) achieve a seamless connection at the connection point, and optionally also (if it is determined that rendering of the uncorrected connection at the connection point would not achieve a seamless connection) correcting the audio content (e.g., including by performing a cross-fade between segments of the uncorrected audio content to generated corrected audio) so that a rendered connection of the corrected audio at the connection point will achieve a seamless connection.

Determination that a specified seamless connection of uncorrected audio segment sequences at a specified connection point would result in an audible discontinuity (e.g., a "pop" or other objectionable and audible artifact), sometimes referred to herein as a "glitch" or "audible glitch," when the connection is rendered at the connection point is sufficient to determine that the specified seamless connection would not in fact be rendered as a seamless connection at the connection point. In some embodiments, detection of an audible glitch at a connection point in an audio/video program having multiple audio channels is done on a per-channel basis (e.g., a per object channel basis), e.g., by looking for high-frequency energy introduced by making the uncorrected connection from audio content of an audio channel of the first audio/video segment sequence to audio content of the corresponding audio channel of the second audio/video segment sequence.

In a first class of embodiments, the invention is a method for detecting whether a rendered version of a specified seamless connection ("SSC") at a connection point, between a first audio segment sequence and a second audio segment sequence, results in an audible discontinuity (e.g., a "pop" or other audible artifact) at the connection point, where an audio segment (a "From" segment, having a first duration) of the first audio segment sequence is followed by (i.e., concatenated with) an audio segment (a "To" segment, having duration at least substantially equal to the first duration) of the second audio segment sequence at the connection point, said method including steps of:

determining (e.g., generating data indicative of) a combined segment comprising an end portion of the From segment followed by (i.e., concatenated with) a beginning portion of the To segment, where the combined segment has duration at least substantially equal to the first duration;

determining (e.g., generating data indicative of) high-frequency (HF) energy of each of the From segment, the To segment, and the combined segment;

determining (e.g., generating data indicative of) a masking value ("PEM") which is at least substantially equal to a greatest one of the HF energy of the From segment, the HF energy of the To segment, and a minimal audible amount of HF energy, and determining a ratio value, R=HEC/PEM, where HEC is the HF energy of the combined segment; and determining that the rendered version of the SSC at the connection point would result in an audible discontinuity if the ratio value, R, exceeds a predetermined threshold value (e.g., R=2.0).

In some embodiments of the invention, the audio content of each audio segment sequence to be connected (in accordance with a specified seamless connection, at a connection point) is a Dolby TrueHD bitstream, and each segment of the audio segment sequence (e.g., each of the last two audio segments, A and B, of the "from" audio segment sequence, and each of the first two audio segments, C and D, of the "to" audio segment sequence, referred to below with reference to FIGS. 7-10) is a Dolby TrueHD access unit (AU). A Dolby TrueHD encoder encodes an audio signal as a sequence of restart intervals. A restart interval is typically constrained to be 8 to 128 access units (AUs) in length, where each access unit (defined for a particular audio sampling frequency) is a segment of a fixed number of consecutive samples. At a 48 kHz sampling frequency, a Dolby TrueHD AU is of length 40 samples or spans 0.833 milliseconds.

Thus, in the description of some embodiments of the present invention (e.g., the FIG. 6 embodiment), each audio segment of an audio segment sequence to be connected (in accordance with a specified seamless connection, at a connection point) is referred to as an "access unit" or "AU". It should be appreciated that each such description also applies more generally to the case that each referenced "AU" is an audio segment other than a Dolby TrueHD access unit.

Determination that a rendered version of an SSC at a connection point would result in an audible discontinuity (sometimes referred to herein as a "glitch" or "audible glitch") at the connection point is sufficient to determine that the rendered version of the SSC at the connection point would not be a seamless connection. Detection of an audible glitch in a rendered version of an SSC at a connection point in an audio/video program having multiple audio channels would typically be done on a per-channel basis (e.g., a per object channel basis), e.g., by determining high-frequency (HF) energy introduced by making the specified seamless connection from uncorrected audio content of an audio channel of the first audio/video segment (the "first AU" or "from AU", where "AU" denotes access unit) to audio content of the corresponding audio channel of the second audio/video segment (the "second AU" or "to AU").

An example of a glitch detection method (an exemplary embodiment in the first class of embodiments) will next be described with reference to FIG. 6. The FIG. 6 method assumes knowledge of a specified seamless connection ("SSC") at a connection point, between a first audio segment sequence and a second audio segment sequence, where an audio segment ("From" segment 20A of FIG. 6, having a first duration) of the first audio segment sequence is followed by (i.e., concatenated with) an audio segment ("To" segment 20B of FIG. 6, having duration at least substantially equal to the first duration) of the second audio segment sequence at the connection point. In this context, an audio "segment sequence" is a sequence of audio samples (not necessarily a "clip" or a "PlayItem" as defined in the Blu-ray Disc standard), and each of two audio segment sequences having substantially the same duration has substantially the same number of audio samples (all having at least substantially the same sample rate). The SSC may, for example, be determined by connection metadata provided with the audio content. The FIG. 6 method determines whether a rendered version of the SSC results in an audible discontinuity (e.g., a "pop" or other audible artifact) at the connection point.

The first step (step 20) of the FIG. 6 method includes steps of:

determining a combined segment (segment 20C of FIG. 6) comprising an end portion (sub-segment) of the From segment followed by (i.e., concatenated with) a beginning portion of the To segment, where the combined segment has duration at least substantially equal to the first duration; and determining high-frequency (HF) energy of each of the From segment 20A, the To segment 20B, and the combined segment 20C.

In a typical implementation, the determination in step 20 of high-frequency (HF) energy in each of segments 20A, 20B, and 20C is accomplished by performing the following operations independently for each of segments 20A, 20B, and 20C (as indicated in FIG. 6):

1. multiply samples of the AU (i.e., segment 20A, or segment 20B, or segment 20C) by a window, thereby generating a windowed signal. The window may be a Hann window, or it may be another window that is not too noisy;
2. apply a high-pass filter to the windowed signal. The high pass filter's cutoff frequency is typically set at 12000 Hz;
3. square each high-pass filtered sample (output from the high-pass filter); and
4. sum the squared, filtered samples to obtain total high-frequency energy in the AU.

Step 20 results in determination of: high-frequency (HF) energy in segment 20A, HF energy in segment 20B, and HF energy around the connection point (i.e., HF energy in segment 20C).

The next step (step 21) of the FIG. 6 method is an analysis step. The analysis includes determination of a value (to be referred to as a "pre-existing-masking" or "PEM" value) equal to the maximum of: the HF energy in segment 20A, the HF energy in segment 20B, and a "threshold-in-quiet" threshold value (i.e., a threshold value indicative of the minimal amount of HF energy that is audible). The threshold-in-quiet value is a constant during performance of the method. The threshold-in-quiet value is introduced so that very quiet noise introduced at the connection point does not trigger glitch detection when the glitch would actually not be (or would barely be) audible.

The analysis in step 21 also includes a step of determining the following ratio value:

ratio=HEC/PEM, in which "PEM" is the above-mentioned PEM value, and "HEC" is the HF energy in combined segment 20C. The "ratio" value is a measure of the HF energy introduced by the connection.

If the "ratio" value is greater than a predetermined threshold value, step 21 results in a determination that rendering of the SSC (i.e., an uncorrected version of the SSC) would produce an audible glitch. Otherwise, step 21 results in a determination that rendering of the SSC would not produce an audible glitch.

An example of a system configured to perform a method in the first class of embodiments is editing system 50 of FIG. 11, in which subsystem 55 is configured to perform the method.

In a second class of embodiments, the invention is a method for analyzing at least one specified seamless connection ("SSC") between audio segment sequences to determine a type of each said SSC, determining whether a rendered version of each said SSC would have an audible discontinuity (sometimes referred to herein as a "glitch" or "audible glitch") at the connection point specified by the SSC, and, for each SSC which has been determined to be of a correctable type and whose rendered version is determined to have an audible discontinuity, correcting (in accordance with the SSC's determined type) at least one uncorrected audio segment of at least one audio segment sequence to be connected in accordance with the SSC, thereby generating at least one corrected audio segment, in an effort to ensure that rendering of the SSC using one said corrected audio segment (in place of the uncorrected audio segment corresponding to the corrected audio segment) will result in seamless connection without an audible discontinuity.

An exemplary embodiment in the second class is a method including steps of:

(a) providing data indicative of audio segment sequences and connection metadata for each audio segment sequence in a subset of the audio segment sequences, where the connection metadata for said each segment sequence is indicative of at least one aspect, feature, and/or type of at least one connection to or from the segment sequence, relative to another one of the segment sequences, in a combined sequence which includes at least a portion of the segment sequence;

(b) analyzing at least one specified seamless connection ("SSC"), specified by the connection metadata, between two of the audio segment sequences to determine a type of each said SSC, including by determining whether the SSC is of a correctable type (e.g., when the SSC is at a connection point, determining that the SSC is not of a correctable type upon determining that the set of all specified seamless connection (s) indicated by the connection metadata at the connection point, to or from either one of the two audio segment sequences, is a set of M-to-N specified seamless connections (of a type to be described below), where each of M and N is an integer greater than one), and determining whether each said SSC is renderable as a rendered connection having an audible discontinuity at the connection point specified by the SSC; and (c) for each SSC which has been determined to be of a correctable type and to be renderable as a rendered connection having an audible discontinuity at the connection point specified by the SSC, correcting (in accordance with the SSC's determined type) at least one uncorrected audio segment of at least one audio segment sequence to be connected in accordance with the SSC, thereby generating at least one corrected audio segment, in an effort to ensure that rendering of the SSC using one said corrected audio segment (in place of the uncorrected audio segment corresponding to the corrected audio segment) will result in seamless connection without an audible discontinuity. Typically, each said corrected audio segment is output for storage in a conventional manner, e.g., in a non-transitory manner on a disc.

Typically, the connection metadata provided in step (a) are indicative of at least one specified seamless connection (SSC) at a connection point between two of the audio segment sequences, and it is not known (at the time of performance of the method) which of two combined sequences (i.e., which of two different renderable versions of the SSC) will be rendered during rendering of the SSC at the connection point (except in at least one special case in which the method determines that only one of the combined sequences will be rendered, i.e., that there is only one renderable version of the SSC), said combined sequences including:

a first combined sequence including a first one of the segment sequences connected (at the connection point) with a second one of the segment sequences (e.g., where segments A and B are the last two segments of the first one of the segment sequences, segment C is the first segment of the second one of the segment sequences, and segment D is the second segment of the second one of the segment sequences); and a second combined sequence including the first one of the segment sequences connected (at the connection point) with a truncated version of the second one of the segment sequences (e.g., where segments A and B are the last two segments of the first one of the segment sequences, and the second segment, D, of the second one of the segment sequences is the first segment of the truncated version of the second one of the segment sequences).

In some implementations, step (b) includes a step of using at least some of the connection metadata to analyze one said SSC at a connection point between a first one of the segment sequences and a second one of the segment sequences, to determine that rendering of the SSC at the connection point will necessarily result in a rendered version of the SSC in which the last segment of the first one of the segment sequences is connected to the first segment of the second one of the segment sequences, and determining whether the rendered version of the SSC would have an audible discontinuity at the connection point, but omitting a step of determining whether an alternative rendered version of the SSC would have an audible discontinuity at the connection point, where in the alternative rendered version of the SSC the last segment of the first one of the segment sequences is connected, at the connection point, to the second segment of the second one of the segment sequences. Similarly, in some implementations, step (b) includes a step of using at least some of the connection metadata to analyze one said SSC at a connection point between a first one of the segment sequences and a second one of the segment sequences, to determine that rendering of the SSC at the connection point will necessarily result in a rendered version of the SSC in which the last segment of the first one of the segment sequences is connected to the second segment of the second one of the segment sequences, and determining whether the rendered version of the SSC would have an audible discontinuity at the connection point, but omitting a step of determining whether an alternative rendered version of the SSC would have an audible discontinuity at the connection point, where in the alternative rendered version of the SSC the last segment of the first one of the segment sequences is connected, at the connection point, to the first segment of the second one of the segment sequences.

In some implementations of step (b), the step of determining whether each said SSC is renderable as a rendered connection having an audible discontinuity at the connection point specified by the SSC includes performance of the method described above with reference to FIG. 6. For example, some implementations of step (b) employ the method of FIG. 6 for audible discontinuity (glitch) detection for each channel of a pair of multi-channel audio segment sequences to be connected in accordance with the SSC.

In some implementations, step (b) includes a step of analyzing one said SSC at a connection point between a first one of the segment sequences and a second one of the segment sequences, to determine that the set of all specified seamless connection(s) indicated by the connection metadata to or from the first one of the segment sequences or the second one of the segment sequences at the connection point consists of N specified seamless connections to the second one of the audio segment sequences at the connection point, one of the N specified seamless connections is from the first one of the audio segment sequences to the second one of the audio segment sequences, and if N is greater than one, at least one other one of the N specified seamless connections is from a third audio segment sequence to the second one of the audio segment sequences, and step (c) includes a step of correcting the last segment, $B_1$, of the first one of the audio segment sequences by replacing said segment $B_1$ with a corrected segment whose audio content is a crossfade from content of said segment $B_1$ to content of the first segment of the second one of the audio segment sequences, correcting the last segment, $B_2$, of the third audio segment sequence by replacing said segment $B_2$ with a second corrected segment whose audio content is a crossfade from content of said segment $B_2$ to content of the first segment of the second one of the audio segment sequences, and correcting the first segment, C, of the second one of the audio segment sequence by replacing said segment C with a third corrected segment whose audio content is a crossfade from content of the second segment of the second one of the audio segment sequences to content of said segment C.

In some implementations, step (b) includes a step of analyzing one said SSC at a connection point between a first one of the segment sequences and a second one of the segment sequences, to determine that the set of all specified seamless connection(s) indicated by the connection metadata to or from the first one of the segment sequences or the second one of the segment sequences at the connection point consists of N specified seamless connections from the first one of the audio segment sequences at the connection point, one of the N specified seamless connections is from the first one of the audio segment sequences to the second one of the audio segment sequences, and if N is greater than one, at least one other one of the N specified seamless connections is from the first one of the audio segment sequences to a third audio segment sequence, and step (c) includes a step of correcting the first segment, $C_1$, of the second one of the audio segment sequences by replacing said segment $C_1$ with a corrected segment whose audio content is a crossfade, from content of a predicted version of segment $C_1$, which has been predicted (preferably using linear prediction) from the last segment of the first one of the audio segment sequences, to content of said last segment of the first one of the audio segment sequences, correcting the first segment, $C_2$, of the third audio segment sequence by replacing said segment $C_2$ with a corrected segment whose audio content is a crossfade, from content of a predicted version of segment $C_2$, which has been predicted (preferably using linear prediction) from the last segment of the first one of the audio segment sequences, to content of said last segment of the first one of the audio segment sequences, correcting the second segment, $D_1$, of the second one of the audio segment sequences by replacing said segment $D_1$ with a corrected segment whose audio content is a crossfade, from content of a predicted version of the first segment, $C_1$, of the second one of the audio segment sequences, which has been predicted (preferably using linear prediction) from the last segment of the first one of the audio segment sequences, to content of said segment $D_1$, and correcting the second segment, $D_2$, of the third audio segment sequence by replacing said segment $D_2$ with a corrected segment whose audio content is a crossfade, from content of a predicted version of the first segment, $C_2$, of said third audio segment sequence, which has been predicted (preferably using linear prediction) from the last segment of the first one of the audio segment sequences, to content of said segment $D_2$.

Another exemplary embodiment in the second class is a method including steps of:

(a) providing data indicative of audio segment sequences and connection metadata for each audio segment sequence in a subset of the audio segment sequences, where the connection metadata for said each segment sequence is indicative of at least one aspect, feature, and/or type of at least one connection to or from the segment sequence, relative to another one of the segment sequences, in a combined sequence which includes at least a portion of the segment sequence;

(b) analyzing at least one specified seamless connection ("SSC"), specified by the connection metadata, between two of the audio segment sequences to determine a type of the SSC, and determining whether the SSC is renderable as a rendered connection having an audible discontinuity at the connection point specified by the SSC; and (c) if the SSC is determined to be renderable as a rendered connection having an audible discontinuity at the connection point specified by the SSC, correcting (in accordance with the SSC's determined type) at least one uncorrected audio segment of at least one audio segment sequence to be connected in accordance with the SSC, thereby generating at least one corrected audio segment, in an effort to ensure that rendering of the SSC using one said corrected audio segment (in place of the uncorrected audio segment corresponding to the corrected audio segment) will result in seamless connection without an audible discontinuity.

In some implementations, the SSC analyzed in step (b) is an SSC at a connection point between a first one of the segment sequences and a second one of the segment sequences, and step (c) includes a determination that the set of all specified seamless connection(s) indicated by the connection metadata to or from the first one of the segment sequences or the second one of the segment sequences at the connection point consists of N specified seamless connections to the second one of the audio segment sequences at the connection point, that one of the N specified seamless connections is from the first one of the audio segment sequences to the second one of the audio segment sequences, and that if N is greater than one, at least one other one of the N specified seamless connections is from a third audio segment sequence to the second one of the audio segment sequences, and step (c) includes a step of correcting the last segment, $B_1$, of the first one of the audio segment sequences by replacing said segment $B_1$ with a corrected segment whose audio content is a crossfade from content of said segment $B_1$ to content of the first segment of the second one of the audio segment sequences, correcting the last segment, $B_2$, of the third audio segment sequence by replacing said segment $B_2$ with a second corrected segment whose audio content is a crossfade from content of said segment $B_2$ to content of the first segment of the second one of the audio segment sequences, and correcting the first segment, C, of the second one of the audio segment sequence by replacing said segment C with a third corrected segment whose audio content is a crossfade from content of the second segment of the second one of the audio segment sequences to content of said segment C.

In some implementations, the SSC analyzed in step (b) is an SSC at a connection point between a first one of the segment sequences and a second one of the segment sequences, and step (c) includes a determination that the set of all specified seamless connection(s) indicated by the connection metadata to or from the first one of the segment sequences or the second one of the segment sequences at the connection point consists of N specified seamless connections from the first one of the audio segment sequences at the connection point, that one of the N specified seamless connections is from the first one of the audio segment sequences to the second one of the audio segment sequences, and that if N is greater than one, at least one other one of the N specified seamless connections is from the first one of the audio segment sequences to a third audio segment sequence, and step (c) includes a step of correcting the first segment, $C_1$, of the second one of the audio segment sequences by replacing said segment $C_1$ with a corrected segment whose audio content is a crossfade, from content of a predicted version of segment $C_1$, which has been predicted (preferably using linear prediction) from the last segment of the first one of the audio segment sequences, to content of said last segment of the first one of the audio segment sequences, correcting the first segment, $C_2$, of the third audio segment sequence by replacing said segment $C_2$ with a corrected segment whose audio content is a crossfade, from content of a predicted version of segment $C_2$, which has been predicted (preferably using linear prediction) from the last segment of the first one of the audio segment sequences, to content of said last segment of the first one of the audio segment sequences, correcting the second segment, $D_1$, of the second one of the audio segment sequences by replacing said segment $D_1$ with a corrected segment whose audio content is a crossfade, from content of a predicted version of the first segment, $C_1$, of the second one of the audio segment sequences, which has been predicted (preferably using linear prediction) from the last segment of the first one of the audio segment sequences, to content of said segment $D_1$, and correcting the second segment, $D_2$, of the third audio segment sequence by replacing said segment $D_2$ with a corrected segment whose audio content is a crossfade, from content of a predicted version of the first segment, $C_2$, of said third audio segment sequence, which has been predicted (preferably using linear prediction) from the last segment of the first one of the audio segment sequences, to content of said segment $D_2$.

With reference to FIG. 10, we next describe an example of a method in the second class. The FIG. 10 embodiment (and some other embodiments of the invention) assume that at least two audio segment sequences (typically, at least three audio segment sequences, i.e., in the N-to-1 or 1-to-N case to be described, with N greater than 1) have been provided, each said segment sequence comprising a sequence of at least two segments of audio data (i.e., at least two segments of audio samples). It is also assumed that, during rendering of a specified seamless connection (SSC) at a connection point between two such audio segment sequences, at least two combined sequences may be rendered (unless an implementation of the method specifically determines that only one such combined sequence may be rendered), said combined sequences including:

a first combined sequence including a first one of the segment sequences connected (at the connection point) with a second one of the segment sequences (e.g., where segments A and B are the last two segments of the first one of the segment sequences, segment C is the first segment of the second one of the segment sequences, and segment D is the second segment of the second one of the segment sequences); and a second combined sequence including the first one of the segment sequences connected (at the connection point) with a truncated version of the second one of the segment sequences (e.g., where segments A and B are the last two segments of the first one of the segment sequences, and the second segment, D, of the second one of the segment sequences is the first segment of the truncated version of the second one of the segment sequences).

In the FIG. 10 embodiment (and some other embodiments of the invention), connection metadata (including the metadata identified in FIG. 10 as a "connection-info" element) may be provided (e.g., in file 100 of FIG. 10) or generated (in accordance with an embodiment of the invention) for each of the segment sequences. The connection metadata for each segment sequence is indicative of at least one aspect, feature, and/or type of connection to or from the segment sequence (relative to another one of the segment sequences) in each combined sequence which includes at least a portion of the segment sequence.

In some implementations, each of the segments of audio data is included in a clip (e.g., a "Clip" as defined by the Blu-ray Disc standard) which also includes video data. In some implementations, each of the audio segment sequences is or is included in a sequence of such clips (e.g., in some embodiments, each audio segment sequence is the audio content of a "PlayItem" or "Clip" as defined by the Blu-ray Disc standard). In some implementations, each combined sequence is the audio content of a "PlayList" as defined by the Blu-ray Disc standard, and the connection metadata for each PlayItem is included in the PlayItem and/or in each PlayList which refers to the PlayItem.

For convenience, when an audio segment sequence is the audio content of a PlayItem (or Clip), we sometimes refer to the PlayItem (or Clip) as the audio segment sequence (although the PlayItem or Clip would typically also include video content), and when a combined sequence is audio content of a PlayList, we sometimes refer to the PlayList as the combined sequence (although the PlayList would typically also include video content).

A specified seamless connection (SSC) between audio segment sequences (e.g., PlayItems) may be specified by metadata corresponding to the segment sequences (e.g., metadata in one of the PlayItems and/or in a PlayList which refers to the PlayItem). An SSC may actually be rendered as a non-seamless ("bad" seamless) connection (i.e., when the rendering results in a perceptible discontinuity at the connection, despite the intention to render the connection seamlessly) or it may actually be rendered seamlessly (as an actual seamless connection).

The FIG. 10 embodiment assumes that in each renderable combined sequence (e.g., each PlayList), a specified seamless connection between audio segment sequences (e.g., PlayItems) which include video data as well as audio data always occurs at a video frame boundary (i.e., the connection point occurs at a video frame boundary).

In the FIG. 10 embodiment, the input audio data (included in file 100) are audio segment sequences which are analyzed (in step 104) in specified circumstances, corrected (in step 120) in appropriate circumstances, and then output for storage (in step 105) and stored in a non-transitory manner in a storage medium (e.g., a disc). In a typical implementation, the input audio data (and corresponding metadata) are in the format known as Dolby TrueHD, and file 100 (which includes the input audio data) is an "MEL file" (as indicated in FIG. 10), where "MEL" denotes "Meridian Editor Language" (an XML-based interface to a Dolby TrueHD bitstream editor).

Steps 113 and 116, 114 and 117, and/or 115 and 118 (of step 104) check whether implementation of a specified seamless connection between segments of the uncorrected input audio data would result in a bad seamless connection (i.e., a connection resulting in a perceptible glitch when rendered). Step 125 or 126 (of step 120) modifies appropriate segments of the input audio data (in appropriate cases to be described herein) so as to apply a fix to a detected bad specified seamless connection (i.e., so that a seamless connection between the modified ("corrected") segments results in an actual seamless connection when rendered).

Initial step 101 of the FIG. 10 method is to parse file 100 to identify the audio segment sequences and corresponding metadata. For each seamless connection specified by metadata in file 100 (i.e., each "specified seamless connection" between audio segment sequences (e.g., PlayItems) of each renderable combined sequence (e.g., PlayList)), step 103 then determines whether file 100 includes connection metadata (identified in FIG. 10 as a "connection info element" and to be described below) which is needed to perform steps 104 and 120. If no "connection info element" is identified in step 103, the input audio sequences are not corrected, and they are instead output for storage (in step 105), e.g., in a non-transitory manner on a disc. If a "connection info element" is identified in step 103, the input audio sequences are analyzed in step 104.

The input audio sequences include at least two audio segment sequences (typically, at least three audio segment sequences, i.e., in the N-to-1 or 1-to-N case to be described below, with N greater than 1), each said segment sequence comprising a sequence of at least two segments of audio data (at least two segments of audio samples).

Each of the segments (e.g., frames or access units) of audio data is included in a clip (e.g., a "Clip" as defined by the Blu-ray Disc standard) which also includes video data. Each of the audio segment sequences is a sequence of such clips (e.g., in some implementations, each of the audio segment sequences is a "PlayItem" as defined by the Blu-ray Disc standard).

Metadata corresponding to the input audio sequences is indicative of combined sequences which may be rendered, each of the combined sequences including at least one connection point at which audio data of one clip is followed by audio data of another clip.

The combined sequences include:

a first combined sequence including a first one of the segment sequences of one clip (to be referred to as a "first" clip or "from" clip or "source" clip) connected (at a connection point) with a second one of the segment sequences of another clip (to be referred to as a "second" clip or "to" clip or "destination" clip), where the second last audio segment and the last audio segment of the first clip are referred to respectively as segments A and B, the first segment of the second clip is referred to as segment C, and the second segment of the second clip is referred to as segment D; and a second combined sequence including the first one of the segment sequences of the first clip connected (at the connection point) with a truncated version of the second one of the segment sequences of the second clip, where segments A and B of the first clip are the last two segments of the first one of the segment sequences, and the second segment, D, of the second one of the segment sequences of the second clip is the first segment of the truncated version of the second one of the segment sequences.

In some implementations, each of the audio segment sequences is a "PlayItem" as defined by the Blu-ray Disc standard, each of the combined sequences is a "PlayList" as defined by the Blu-ray Disc standard, and connection metadata (including a "connection info element") for each PlayItem is included in the PlayItem and/or in each PlayList which refers to the PlayItem. In such implementations, in each combined sequence (e.g., PlayList), each specified seamless connection between audio segment sequences (e.g., PlayItems) always occurs at a video frame boundary (i.e., the connection point occurs at a video frame boundary).

In some implementations of FIG. 10, the audio content of each audio segment sequence is a Dolby TrueHD bitstream, and each segment of the audio segment sequence (e.g., each of above-mentioned segments A, B, C, and D) is a Dolby TrueHD access unit (AU). A Dolby TrueHD encoder encodes an audio signal as a sequence of restart intervals. A restart interval is typically constrained to be 8 to 128 access units (AUs) in length, where each access unit (defined for a particular audio sampling frequency) is a segment of a fixed number of consecutive samples. At a 48 kHz sampling frequency, a Dolby TrueHD AU is of length 40 samples or spans 0.833 milliseconds.

In the FIG. 10 embodiment, connection metadata (including a "connection info" element of the type mentioned with reference to step 103 of FIG. 10) may be provided for each of the segment sequences (PlayItems). The connection metadata for each segment sequence is indicative of at least one aspect, feature, and/or type of connection to or from the segment sequence (relative to another segment sequence) in each combined sequence (PlayList) which includes at least a portion of the segment sequence.

The following description of an implementation of FIG. 10 assumes that each audio segment sequence is a Dolby TrueHD bitstream, each audio segment sequence is a "PlayItem" as defined by the Blu-ray Disc standard, each renderable combined sequence is a "PlayList" as defined by the Blu-ray Disc standard, the presentation time stamp (PTS) values of the MPEG-2 PES packets within the clips that form the PlayItems (and thus of each of audio segments A, B, C, and D of each PlayItem) are based on a 90 kHz clock, and the connection metadata which may be provided for each of the segment sequences (PlayItems) includes a "connection info" element for each specified seamless connection of each renderable combined sequence (PlayList) at which the PlayItem is a "from" clip or a "to" clip. The "connection info" element is indicative of the following values for each of the "from" clip (whose last two AUs are segment A and segment B) and the "to" clip (whose first two AUs are segment C and segment D) of the PlayList to be connected at the connection point:

pts-offset (the offset between audio and video at the beginning of the clip, e.g., in 90 kHz units at the beginning of the clip);

clip-duration (the duration of the clip, e.g., in 90 kHz units);

cc5-in-count (for each "to" clip, the number of clips that connect into the clip seamlessly. I.e., the number of renderable PlayLists which include a "from" clip that connects to the clip seamlessly); and cc5-out-count (for each "from" clip, the number of clips to which the "from" clip connects seamlessly. I.e., the number of renderable PlayLists which include a "to" clip to which the "from" clip connects seamlessly).

In the exemplary implementation of FIG. 10 method, step 103 determines (for each PlayItem of each PlayList) whether file 100 includes a "connection info" element for a specified seamless connection at which audio content (a clip) of the PlayItem is to be connected to or from audio content (another clip) of another PlayItem of the PlayList. If no "connection info element" is identified in step 103, the PlayItem is not corrected, and is instead output for storage in a conventional manner (in step 105), e.g., in a non-transitory manner on a disc. If a "connection info element" is identified in step 103, audio segment sequences of the Playlist are analyzed in step 104.

In this implementation, the FIG. 10 method determines (in steps 104 and 120), for each PlayList (for which a "connection info" element has been identified) and for each specified seamless connection of the PlayList, from corresponding metadata in file 100 (i.e., connection metadata, including the connection info element for the specified seamless connection, and metadata indicative of the video frame rate), each type of connection which may be rendered to implement the specified seamless connection at the relevant connection point. For each such specified seamless connection at a connection point, the last two AUs (access units) of the "from" clip will be referred to as segment (or "AU") A and segment (or "AU") B, and the first two AUs of the "to" clip will be referred to as segment (or "AU") C and segment (or "AU") D. For example, step 101 determines whether the connection will certainly be rendered as a B→C connection (in which the first segment of the "to" clip is not dropped), or will certainly be rendered as a B→D connection (in which the first segment of the "to" clip is dropped), or whether it is unknown whether the connection will be rendered as a B→D connection or as a B→C connection. In response to the determined type of connection, the method may check (in step 113 or step 115) only if a single renderable connection type contains a discontinuity, or it may check (in step 114) whether each of both renderable versions of the connection (i.e., a B→C version, in which the first segment of the "to" clip is not dropped, and a B→D version in which the first segment, C, of the "to" clip is dropped) contains a discontinuity.

Performance of step 104 includes performance of a subset of steps 107-119 and 105, as shown in FIG. 10 for each specified seamless connection. Performance of step 120 includes performance of a subset of steps 121-127 and 105, as shown in FIG. 10 for each specified seamless connection. In step 107, time offset (of the start of each of segments A, B, C, and D from the connection point) is checked. The PTS value of the connection point is assumed to be 0 for the "to" clip (i.e., for segments C and D), and the PTS value of the connection point for the "from" clip (i.e., for segments A and B) is assumed to be the duration of the "from" clip, the offset of segment A is the duration (in PTS units) of the "from" (source) clip minus the PTS of segment A, the offset of segment B is the duration (in PTS units) of the "from" (source) clip minus the PTS of segment B, the offset of segment C is 0 minus the PTS of segment C, and the offset of segment D is 0 minus the PTS of segment D.

Steps 108 and 110 determine from the time offset values (determined in step 107) whether the overlap between segments A and B, and segments C and D, is zero, or greater than or equal to the duration of one AU, or greater than zero but less than the duration of one AU. If the overlap is determined (in step 110) to be zero, then step 112 is performed. If the overlap is determined (in step 108) to be greater than or equal to the duration of one AU, then step 109 is performed. If the overlap is determined to be greater than zero but less than the duration of one AU, then step 114 is performed.

In step 112, it is determined whether the video frame rate at the connection point is an integer frame rate (e.g., 24 or 25 fps) or a non-integer frame rate (e.g. 23.976 or 29.97 fps).

If it is determined that the video frame rate is an integer frame rate, then step 113 is performed (since in this case, segment C will certainly not be dropped during rendering of the audio content at the connection point). If it is determined that the video frame rate is not an integer frame rate, then step 114 is performed (since in this case, it is assumed that it cannot be known in advance whether segment C will be dropped, to implement the connection from segment B to segment D rather than from segment B to segment C, during rendering of the audio content at the connection point).

In steps 109 and 111, the equivalence of overlapped audio at (i.e., near) the connection point is checked. It is assumed (e.g., as contemplated by the Blu-ray Disc specification) that the audio content of the "from" clip which overlaps audio content of the "to" clip, near a specified seamless connection point, may or may not be identical to the audio content of the overlapped portion of the "to" clip. If it is determined in step 111 that the audio content of segment B (or segments A and B) which overlaps audio content of segment C (or segments C and D) near the specified seamless connection point, is identical to the audio content of the overlapped portion of segment C (or segments C and D), then step 115 is performed (since in this case, segment C will certainly be dropped during rendering of the audio content at the connection point). If it is determined in step 111 that the audio content of segment B (or segments A and B) which overlaps audio content of segment C (or segments C and D) near the specified seamless connection point, is not identical to the audio content of the overlapped portion of segment C (or segments C and D), then step 114 is performed (since in this case, it is assumed that it cannot be known in advance whether segment C will be dropped, to implement the connection from segment B to segment D rather than from segment B to segment C, during rendering of the audio content at the connection point).

Steps 113 and 116 of the exemplary implementation of the FIG. 10 method determine whether the specified seamless connection would result in an audible discontinuity ("glitch") at the connection point when rendered. When the audio content of segments A, B, C, and D includes multiple audio channels, the discontinuity detection in step 113 is typically performed on a per-channel basis (e.g., a per object channel basis). To implement step 113, the discontinuity ("glitch") detection method of FIG. 6 may be performed (for each audio channel) to determine whether the specified seamless connection would result in an audible discontinuity at the connection point when rendered, including by determining high-frequency energy introduced by rendering the specified seamless connection from audio content of an audio channel of segment B (considered as the "from AU" in FIG. 6) to audio content of the corresponding audio channel of segment C (considered as the "to AU" in FIG. 6). If step 113 determines that the specified seamless connection would result in an audible discontinuity at the connection point when rendered (as indicated by a "yes" output of step 116), step 120 is performed to correct one or more of segments A, B, C, and D (in a manner to be described below). If step 113 determines that the specified seamless connection would not result in an audible discontinuity at the connection point when rendered (as indicated by a "no" output of step 116), then the segments A, B, C, and D are not corrected, and are instead output for storage in a conventional manner (in step 105), e.g., in a non-transitory manner on a disc.

Steps 115 and 118 of the exemplary implementation of the FIG. 10 method determine whether the specified seamless connection would result in an audible discontinuity ("glitch") at the connection point when rendered. When the audio content of segments A, B, C, and D includes multiple audio channels, the discontinuity detection in step 115 is typically performed on a per-channel basis (e.g., a per object channel basis). To implement step 115, the discontinuity detection method of FIG. 6 may be performed (for each audio channel) to determine whether the specified seamless connection would result in an audible discontinuity at the connection point when rendered, including by determining high-frequency energy introduced by rendering the specified seamless connection from audio content of an audio channel of segment B (considered as the "from AU" in FIG. 6) to audio content of the corresponding audio channel of segment D (considered as the "to AU" in FIG. 6). If step 115 determines that the specified seamless connection would result in an audible discontinuity at the connection point when rendered (as indicated by a "yes" output of step 118), step 119 is performed to generate a warning that the discontinuity is present (and has not been corrected). If step 115 determines that the specified seamless connection would not result in an audible discontinuity at the connection point when rendered (as indicated by a "no" output of step 118), then the segments A, B, C, and D are not corrected, and are instead output for storage in a conventional manner (in step 105), e.g., in a non-transitory manner on a disc.

Steps 114 and 117 of the exemplary implementation of the FIG. 10 method determine whether the specified seamless connection would result in an audible discontinuity ("glitch") at the connection point when rendered, in both the case that segment C is dropped during rendering and the case that segment C is not dropped during rendering. When the audio content of segments A, B, C, and D includes multiple audio channels, the discontinuity detection in step 114 is typically performed on a per-channel basis (e.g., a per object channel basis). To implement step 114, the discontinuity ("glitch") detection method of FIG. 6 may be performed twice (for each audio channel), once for the case that segment C is dropped during rendering, and once for the case that segment C is not dropped during rendering) to determine whether the specified seamless connection would result in an audible discontinuity at the connection point when rendered (either with segment C dropped or with segment C not dropped), including by:

determining high-frequency energy introduced by rendering the specified seamless connection from audio content of an audio channel of segment B (considered as the "from AU" in FIG. 6) to audio content of the corresponding audio channel of segment C (considered as the "to AU" in FIG. 6); and determining high-frequency energy introduced by rendering the specified seamless connection from audio content of an audio channel of segment B (considered as the "from AU" in FIG. 6) to audio content of the corresponding audio channel of segment D (considered as the "to AU" in FIG. 6).

If step 114 determines that the specified seamless connection would result in an audible discontinuity at the connection point when rendered (as indicated by a "yes" output of step 117), step 120 is performed to correct one or more of segments A, B, C, and D (in a manner to be described below). If step 114 determines that the specified seamless connection would not result in an audible discontinuity at the connection point when rendered (as indicated by a "no" output of step 117), then the segments A, B, C, and D are not corrected, and are instead output for storage in a conventional manner (in step 105), e.g., in a non-transitory manner on a disc.

As noted, during rendering of a specified seamless connection (i.e., a seamless connection specified by a PlayList), a Blu-ray Disc player may choose to play the last access unit (segment B) of the "from" clip followed by the first access unit (segment C) of the "to" clip. This is indicated in FIG. 7 as a transition from segment B to segment C. Alternatively, during rendering of the same specified seamless connection, the disc player may choose to play the last access unit (segment B) of the "from" clip followed by the second access unit (segment D) of the "to" clip. This is indicated in FIG. 7 as a transition from segment B to segment D. It may not be known at editing time (i.e., at the time of mastering of the disc) which sequence will be chosen by the player.

The FIG. 10 method determines (in step 104) whether rendering of such a specified seamless connection will (i.e., is likely to) result in a bad seamless connection (with an audible discontinuity), and corrects (in step 120) the audio content that may be processed by the player so that the specified seamless connection will be rendered as an actual seamless connection (regardless of the specific manner in which the player renders the specified seamless connection). Typical implementations of the FIG. 10 method (including the above-described exemplary implementation) perform the audio content correction in such a way that, regardless of the specific manner in which the specified seamless connection is rendered, the audio content correction will prevent both:

a potential glitch at the connection point due to connecting two unaligned segments of audio; and a potential glitch at the connection point due to player skipping (dropping) the first segment (e.g., access unit) of the "to" clip.

It should be appreciated that there may be two or more specified seamless connections to a single clip, or two or more specified seamless connections from a single clip. For example, at one such specified seamless connection, audio content ("from" clip 1) of a first PlayItem is to be connected to audio content ("to" clip 1) of one PlayItem. For another example, at another one of the specified seamless connections, the same audio content ("from" clip 1) of the first PlayItem is to be connected to audio content ("to" clip 2) of another PlayItem. Alternatively, at one of the specified seamless connections audio content ("from" clip 1) of a PlayItem is to be connected to audio content ("to" clip 1) of a first PlayItem, and at another one of the specified seamless connections audio content ("from" clip 2) of another PlayItem is to be connected to the same audio content ("to" clip 1) of the first PlayItem. Since step 120 treats different cases of multiple specified seamless connections (to or from a single, common clip) differently, we next describe such cases in more detail with reference to FIGS. 8 and 9.

FIG. 8 shows an example of a "one-to-many" ("1-to-N") set of specified seamless connections, in the case that N=3. In the FIG. 8 example, there are three specified seamless connections, each of which is selectable (e.g., in the sense that a rendering system may select one of the specified seamless connections by selecting a PlayList which specifies it):

a specified seamless connection in which a clip whose last two segments are A and B is followed by a clip whose first two segments are C1 and D1;

a second specified seamless connection in which the clip whose last two segments are A and B is followed by a clip whose first two segments are C2 and D2; and a third specified seamless connection in which the clip whose last two segments are A and B is followed by a clip whose first two segments are C3 and D3.

FIG. 9 shows an example of a "many-to-one" ("N-to-1") set of specified seamless connections, in the case that N=3. In the FIG. 9 example, there are three specified seamless connections, each of which is selectable (e.g., in the sense that a rendering system may select one of the specified seamless connections by selecting a PlayList which specifies it):

a specified seamless connection in which a clip whose last two segments are A1 and B1 is followed by a clip whose first two segments are C and D;

a second specified seamless connection in which a clip whose last two segments are A2 and B2 is followed by the clip whose first two segments are C and D; and a third specified seamless connection in which a clip whose last two segments are A3 and B3 is followed by the clip whose first two segments are C and D.

In the case of "1-to-N" specified seamless connections (e.g., the FIG. 8 example), step 120 of the FIG. 10 method is performed to ensure that the audio content correction corrects the audio content that may be processed by the rendering system during rendering of any of the specified seamless connections, so that the specified seamless connection will be rendered as an actual seamless connection (regardless of the specific manner in which the specified seamless connection is rendered). In addition, one of the specified seamless connections may be a "playthrough" case, in which it is preferable to not correct audio content of the "from" clip (e.g., segments A and B). This leads to a solution (in the case of "1-to-N" specified seamless connections) in which step 120 corrects only audio content of the "to" clip (e.g., segments Ci and Di, where the range of index i is from 1 through N).

Next, we describe in more detail step 120 of FIG. 10 (which includes a subset of steps 121, 122, 123, 124, 125, 126, and 127 indicated in FIG. 10).

Initial step 121 of step 120 determines for each specified seamless connection (from a segment B to a segment C) for which a discontinuity has been identified in step 116, and each specified seamless connection (from a segment B to a segment C or D) for which a discontinuity has been identified in step 117, from corresponding metadata in file 100, whether the set of all specified seamless connection(s) to or from either the segment B or the following segment C (or the segment B or the following segment D) is a set of "many-to-many" ("M-to-N") specified seamless connections, where each of M and N is an integer greater than one. If step 121 determines that the set of specified seamless connection(s) is a set of "many-to-many" ("M-to-N") specified seamless connections, then step 124 is performed to generate a warning that a discontinuity in a specified seamless connection is present but has not been corrected (the exemplary implementation of the FIG. 10 method does not perform correction in this case). If step 121 determines that the set of specified seamless connection(s) is not a set of "many-to-many" ("M-to-N") specified seamless connections, then step 122 is performed.

Step 122 of step 120 determines for each specified seamless connection (from a segment B to a segment C) for which a discontinuity has been identified in step 116, and each specified seamless connection (from a segment B to a segment C or D) for which a discontinuity has been identified in step 117, from corresponding metadata in file 100, whether the set of all specified seamless connection(s) to or from either the segment B or the following segment C (or the segment B or the following segment D) is a set of "N-to-1" specified seamless connections, where N is an integer greater than or equal to one. If step 122 determines that the set of specified seamless connection(s) is such a set of "N-to-1" specified seamless connections, then step 125 is performed to correct the audio data (in a manner to be described below) to ensure that when the corrected audio data is rendered to implement the specified seamless connection, the specified seamless connection is rendered as an actual seamless connection (regardless of the specific manner in which the specified seamless connection is rendered). If step 122 determines that the set of specified seamless connection(s) is not such a set of "N-to-1" specified seamless connections, then step 123 is performed.

Step 123 of step 120 determines for each specified seamless connection (from a segment B to a segment C) for which a discontinuity has been identified in step 116, and each specified seamless connection (from a segment B to a segment C or D) for which a discontinuity has been identified in step 117, from corresponding metadata in file 100, whether the set of all specified seamless connection(s) to or from either the segment B or the following segment C (or the segment B or the following segment D) is a set of "1-to-N" specified seamless connections, where N is an integer greater than or equal to one. If step 123 determines that the set of specified seamless connection(s) is such a set of "1-to-N" specified seamless connections, then step 126 is performed to correct the audio data (in a manner to be described below) to ensure that when the corrected audio data is rendered to implement the specified seamless connection, the specified seamless connection is rendered as an actual seamless connection (regardless of the specific manner in which the specified seamless connection is rendered). If step 123 determines that the set of specified seamless connection(s) is not such a set of "1-to-N" specified seamless connections, then step 127 is performed to generate a warning that a discontinuity in a specified seamless connection has been detected but has not been corrected (the exemplary implementation of the FIG. 10 method does not perform correction in this case). The uncorrected "to" clips and "from" clip are output for storage in a conventional manner (in step 105), e.g., in a non-transitory manner on a disc.

Next, we describe in more detail step 126 of the exemplary implementation of the FIG. 10 method. The description will use the following terminology:

$C_{predicted,i}$ denotes a predicted version of segment $C_i$ which has been predicted (using linear prediction) from segment B;

$D^*_i$ denotes a segment whose audio content is a crossfade from the content of segment $C_{predicted,i}$ to the content of segment $D_i$; and $C^*_i$ denotes a segment whose audio content is a crossfade from the content of segment $C_{predicted,i}$ to the content of segment B.

In step 126 of the exemplary implementation, segments C and D of each of the N "to" clips are corrected, but no data of the single "from" clip is corrected. Specifically, for the "i"th "to" clip (whose first two segments are $C_i$ and $D_i$), where index i ranges from 1 through N, the segment $C_i$ is replaced by above-defined segment $C^*_i$; and the segment $D_i$ is replaced by above-defined segment $D^*_i$. The corrected versions of the "to" clips (and the uncorrected "from" clip) are output for storage in a conventional manner (in step 105), e.g., in a non-transitory manner on a disc.

This correction is sufficient to correct each specified seamless correction, since a rendered transition from segment B to each segment $D^*_i$ is continuous, and a rendered transition from segment B to each segment $C^*_i$ is also continuous. The rendered transition from segment B to segment $D^*_i$ is continuous because B is continuous with $C_{predicted}$ by construction (i.e., by the definition of $C_{predicted}$). Thus, since segment $D^*_i$ starts with $C_{predicted}$, the rendered transition from B to $D^*_i$ is continuous. The rendered transition from segment B to segment $C^*_i$ is continuous because B is continuous with $C_{predicted}$ by construction (i.e., by the definition of $C_{predicted}$), and thus, since segment $C^*_i$ starts with $C_{predicted}$, the rendered transition from B to $C^*_i$ is continuous. Furthermore, the transition from $C^*_i$ to $D^*_i$ is continuous because $C^*_i$ ends with segment B, and $D^*_i$ begins with $C_{predicted,i}$, and as noted before, B is continuous with $C_{predicted,i}$ by construction.

In a special case of performance of step 126, it is known (from connection metadata) that during rendering of each specified seamless connection, the rendering will be from the last segment (B) of the "from" clip to the first segment ($C_i$) of each of at least one of the N "to" clips. In this case, step 126 may correct segment $C_i$ (but not segment $D_i$) of said each of at least one of the "to" clips by replacing the segment $C_i$ with above-defined segment $C^*_i$ (no data of the single "from" clip is corrected, as in the general case).

In another special case of performance of step 126, it is known (from connection metadata) that during rendering of each specified seamless connection, the rendering will be from the last segment (B) of the "from" clip to the first segment ($D_i$) of each of at least one of the N "to" clips. In this case, step 126 may correct segment $D_i$ (but not segment $C_i$) of said each of at least one of the "to" clips by replacing the segment $D_i$ with above-defined segment $D^*_i$, (no data of the single "from" clip is corrected, as in the general case).

It is contemplated that an FIR (finite impulse response) linear predictor, for use in determining each $C_{predicted}$ segment (or each $C_{minus40}$ segment described below with reference to step 125), can be designed based on the input signal, with a given order, using the Levinson-Durbin recursion algorithm.

Next, we describe in more detail step 125 of the exemplary implementation of the FIG. 10 method. The description will use the following terminology:

$C_{minus40}$ denotes a predicted version of segment B which has been predicted (backwards in time) from the first segment, C, of the "to" clip;

$B^*_i$ denotes a segment whose audio content is a crossfade from the content of the last segment, $B_i$ of the "i"th "from" clip to the first segment, C, of the "to" clip; and $C^*$ denotes a segment whose audio content is a crossfade from the second segment, D, of the "to" clip to the first segment, C, of the "to" clip.

Step 125 is performed in the case of "N-to-1" specified seamless connection(s) (e.g., the FIG. 9 example), and is performed to ensure that the audio content correction corrects the audio content that may be processed by the rendering system during rendering of any of the specified seamless connection(s), so that the specified seamless connection will be rendered as an actual seamless connection (regardless of the specific manner in which the specified seamless connection is rendered). However, it cannot be assumed that the same correction applied in step 126 can be used in step 125 to achieve the desired result, because multiple 'from' clips would impose conflicting definitions (in step 126) of $C^*$ and $D^*$. Another problem with employing (in step 125) the same correction applied in step 126 is that at least one specified seamless correction may be a playthrough case (in which the specified connection is guaranteed to be rendered by skipping from segment B, to segment D) in which correction should not be performed.

However, the inventors have recognized that in the playthrough case, segment C can be modified without affecting playthrough.

Thus, in step 125 of the exemplary implementation, segment $B_i$ of each of the N "from" clips is corrected, and a segment C of the "to" clip is corrected. Specifically, for the "i"th "from" clip (whose last two segments are $A_i$ and $B_i$), where index i ranges from 1 through N, the segment $B_i$ is replaced by above-defined segment $B^*_i$. Also, segment C (the first segment of the "to" clip) is replaced by above-defined segment C*. The corrected versions of the clips are output for storage in a conventional manner (in step 105), e.g., in a non-transitory manner on a disc.

In a special case of performance of step 125, it is known (from connection metadata) that during rendering of each specified seamless connection, the rendering will be from the last segment ($B_i$) of each of at least one of the N "from" clips to the first segment (C) of the "to" clip. In this case, step 125 may correct the last segment $B_i$ of each of said at least one of the "from" clips by replacing the segment, $B_i$ by a segment which is a crossfade from $B_i$ to above-defined segment $C_{minus40}$ (or, preferably, for optimization, if the 'playthrough' segment B is available and continuous, replacing the segment, $B_i$ by a crossfade instead from B, to B). In this special case, no data of the single "to" clip is corrected.

In another special case of performance of step 125, it is known (from connection metadata) that during rendering of each specified seamless connection, the rendering will be from the last segment ($B_i$) of each of at least one of the N "from" clips to the second segment (D) of the "to" clip. In this case, step 125 may correct the last segment $B_i$ of each of said at least one of the "from" clips by replacing the segment, $B_i$ by a segment which is a cross-fade from the segment B, to segment C (no data of the single "to" clip is corrected).

In steps 125 and 126, it is expected that adequate correction may typically be obtained if each crossfade applied between samples of audio content included in file 100 (or between such samples and predicted samples generated by processing samples included in file 100) is implemented over a short interval (e.g., comprising only 20 samples). It is expected that adequate prediction (to generate predicted samples for use in performing a crossfade) can be performed even when learning from just 40 samples.

Typically, step 104 of the FIG. 10 embodiment analyzes each pair of audio segment sequences of file 100 between which a specified seamless connection (as indicated by connection metadata included in file 100) may be implemented during rendering of each independent (main) presentation which may be rendered based on audio content of file 100. Typically, step 120 corrects such analyzed audio content in appropriate circumstances (e.g., those described herein) in an effort to ensure (e.g., to ensure) that each such specified seamless connection is rendered seamlessly. The audio content of each such independent presentation is typically multichannel audio content (indicative of some number, X, of audio channels, which may be or include object channels and/or speaker channels). Additionally, it may be intended that one or more downmixed versions (comprising fewer than X audio channels) of each independent presentation may be rendered.

Some implementations of the FIG. 10 method (and other embodiments of the invention) include a step of analyzing each pair of downmixed audio segment sequences, which are downmixed versions of non-downmixed audio segment sequences (e.g., downmixed audio segment sequences included in file 100 of FIG. 10, or downmixed audio segment sequences generated from non-downmixed audio segment sequences included in file 100 of FIG. 10), and between which a specified seamless connection as indicated by connection metadata (e.g., connection metadata included in file 100) may be implemented during rendering of a downmixed version of an independent presentation based on the non-downmixed audio content. Typically, such analyzed downmixed audio content is corrected in appropriate circumstances, to ensure that each such specified seamless connection (of a downmixed presentation) is rendered seamlessly.

Another aspect of the invention is an editing system, configured to perform any embodiment of the inventive method. We next describe an embodiment of such an editing system with reference to FIG. 11, which is a block diagram of elements of an embodiment of the inventive editing system (editing system 50 of FIG. 11), and a storage medium (storage medium 60 of FIG. 11) in which audio content (generated in accordance with an embodiment of the invention) is stored in a non-transitory manner.

Editing system 50 includes memory 51 in which audio segment sequences and corresponding metadata (including connection metadata) are stored. The stored audio segment sequences and metadata may be of the type included in file 100 of the FIG. 10 embodiment.

Processing subsystem 55 of system 50 is coupled and configured (e.g., programmed) to receive and process metadata (including connection metadata) and uncorrected audio segment sequences from memory 51, including by identifying specified seamless connections ("SSC"s) indicated by the metadata, analyzing each SSC to determine its type (e.g., in the manner performed in steps 107-112 and steps 121-123 of the FIG. 10 embodiment), detecting (i.e., determining) whether each SSC of at least a subset of the SSCs would result in an audible discontinuity at the corresponding connection point when rendered (e.g., as in steps 113 and 116, 114 and 117, and/or 115 and 118 of the FIG. 10 method), and generating at least one warning that a detected renderable discontinuity has not been corrected (e.g., as in step 119, 124 or 127 of the FIG. 10 method). In some implementations, the discontinuity detection performed by subsystem 55 is of the type described herein with reference to FIG. 6).

Multiplexing subsystem 52 is coupled and configured to assemble (under control of subsystem 55) combined sequences of audio segments (i.e., audio segments stored in memory 51) which are indicative of renderable SSCs and asserts the assembled sequences to subsystem 55 for performance of discontinuity detection thereon.

Subsystem 55 is coupled and configured (e.g., programmed) to determine which of the audio segments stored in memory 51 should undergo correction and the type of correction to be performed thereon (e.g., correction as in step 125 or step 126 of the FIG. 10 method), and to generate (and assert to correction subsystem 53) control data for controlling the performance of the correction which it determines should be performed. Correction subsystem 53 is coupled and configured to correct (in response to control data from subsystem 55) each audio segment which is to be corrected, thereby generating corrected audio segments. Formatting subsystem 54 of FIG. 11 is coupled and configured to assemble the corrected audio segments output from subsystem 53 (some of which may be identical to the uncorrected audio segments input to subsystem 53, because no correction is performed thereon), and corresponding metadata (e.g., metadata indicative of any warning generated by subsystem 55) into an encoded bitstream which is then asserted to storage medium 60 (which may be a Blu-ray Disc, or other disc) for storage in a conventional manner (e.g., in a non-transitory manner) in storage medium 60. The encoded bitstream output from subsystem 54 may include both audio content (determined by the corrected and uncorrected audio segments) and video content corresponding to the audio content. For example, in some implementations the encoded bitstream output from subsystem 54 is in a format for storage on a Blu-ray Disc, and includes both encoded audio data (e.g., Dolby TrueHD encoded audio) and video data.

An aspect of the invention is storage medium 60 (which may be a Blu-ray Disc, or other disc) in which data indicative of at least one corrected audio segment generated in accordance with any embodiment of the invention (and/or metadata generated in accordance with any embodiment of the invention) is stored in a non-transitory manner.

Other aspects of the invention are a rendering system configured to perform an embodiment of the inventive method, and a rendering system including a memory in which metadata generated in accordance with any embodiment of the invention, and/or data indicative of at least one corrected audio segment generated in accordance with any embodiment of the invention, is stored in a non-transitory manner We next describe an embodiment of such a rendering system with reference to FIG. 12.

FIG. 12 is a block diagram of elements of an embodiment (rendering system 70) of the inventive rendering system, and a storage medium (storage medium 60) in which audio content (and metadata) generated in accordance with an embodiment of the invention is stored in a non-transitory manner. Storage medium 60 of FIG. 12 may be the storage medium (also identified as storage medium 60) shown in FIG. 11.

In some implementations, rendering system 70 is a disc player (e.g., a Blu-ray Disc player) configured to read and process (including by rendering) data stored in medium 60 (which is a Blu-ray Disc, when system 70 is a Blu-ray Disc player). In typical implementations, system 70 includes additional elements and subsystems that are not shown in FIG. 12.

Rendering system 70 includes buffer memory 78, which is coupled to receive data read from storage medium 60 (e.g., by a data reading subsystem, not shown in FIG. 12, of system 70). In typical operation, memory 78 stores (in a non-transitory manner) at least one frame or other segment of corrected audio content generated by an embodiment of the inventive method, and/or metadata generated in accordance with an embodiment of the invention, which has been read from storage medium 60.

Rendering system 70 also includes initial processing subsystem 71, which is coupled and configured to parse data read from storage medium 60 to identify audio data (indicative of corrected audio segments and typically also uncorrected audio segments) generated in accordance with an embodiment of the inventive method, and typically also video data (corresponding to the audio data), and metadata corresponding to the audio data (or the audio data and corresponding video data). The metadata typically includes metadata indicative of PlayLists or other combined sequences of audio segments (and optionally also corresponding video data) which are selectable for rendering, and optionally also metadata indicative of at least one warning generated in accordance with an embodiment of the invention (e.g., a warning generated in step 119, 124, or 127 of the FIG. 10 method). In operation, subsystem 71 may perform other processing operations on data read from storage medium 60 (e.g., decoding of parsed audio and/or video data).

The output of subsystem 71 is or includes a set of audio segment sequences. At least one of these audio segment sequences includes at least one corrected audio segment generated in accordance with an embodiment of the invention. The audio segment sequences, or segments thereof (including at least one corrected audio segment generated in accordance with an embodiment of the invention), are stored in a non-transitory manner in memory 73.

Control subsystem 72 is coupled and configured to generate rendering control data, in response to at least some of the parsed metadata output from subsystem 71, and typically also in response to at least one control signal (e.g., a control signal asserted to subsystem 72 from a user, via a user interface) indicative of a selected PlayList or other combined sequence of audio segments (and optionally also corresponding video data) which has been selected for rendering. Subsystem 72 is coupled and configured to assert the rendering control data to memory 73 and multiplexing subsystem 74.

Multiplexing subsystem 74 is coupled and configured to assemble (under control of subsystem 72) at least one combined sequence of audio segments (from audio segments read from memory 73) which has been selected for rendering. Typically, at least one such combined sequence includes at least one connection point at which a corrected audio segment (generated in accordance with an embodiment of the invention) is connected to (concatenated with) another audio segment (which may also be a corrected audio segment generated in accordance with an embodiment of the invention).

Rendering subsystem 75 of system 70 is coupled and configured to render each combined sequence of audio segments (typically including at least one audio segment which has undergone correction in accordance with an embodiment of the invention) output from subsystem 74. In typical operation, subsystem 75 seamlessly renders at least one specified seamless connection (indicated by metadata parsed by subsystem 71) in at least one combined sequence of audio segments.

Embodiments of the invention may be implemented in hardware, firmware, or software, or a combination thereof (e.g., as a programmable logic array). For example, encoding system 50 or rendering system 70, or subsystems of either of them, may be implemented in appropriately programmed (or otherwise configured) hardware or firmware, e.g., as a programmed general purpose processor, digital signal processor, or microprocessor. Unless otherwise specified, the algorithms or processes included as part of the invention are not inherently related to any particular computer or other apparatus. In particular, various general-purpose machines may be used with programs written in accordance with the teachings herein, or it may be more convenient to construct more specialized apparatus (e.g., integrated circuits) to perform the required method steps. Thus, the invention may be implemented in one or more computer programs executing on one or more programmable computer systems (e.g., a computer system which implements an encoding system or rendering system, or at least one subsystem thereof), each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such program may be implemented in any desired computer language (including machine, assembly, or high level procedural, logical, or object oriented programming languages) to communicate with a computer system. In any case, the language may be a compiled or interpreted language.

For example, when implemented by computer software instruction sequences, various functions and steps of embodiments of the invention may be implemented by multithreaded software instruction sequences running in suitable digital signal processing hardware, in which case the various devices, steps, and functions of the embodiments may correspond to portions of the software instructions.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be implemented as a computer-readable storage medium, configured with (i.e., storing) a computer program, where the storage medium so configured causes a computer system to operate in a specific and predefined manner to perform the functions described herein.

While implementations have been described by way of example and in terms of exemplary specific embodiments, it is to be understood that implementations of the invention are not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
   (a) providing data indicative of a set of audio segment sequences and connection metadata for each audio segment sequence in a subset of the set of audio segment sequences, where the connection metadata for said each audio segment sequence is indicative of at least one aspect, feature, or type of at least one connection to or from the audio segment sequence, relative to another one of the audio segment sequences, in a combined sequence which includes at least a portion of the audio segment sequence;
   (b) analyzing at least one specified seamless connection ("SSC"), at a connection point between two of the audio segment sequences, of a plurality of SSCs specified by the connection metadata at the connection point, to determine whether the SSC is of a correctable type, and whether a rendered SSC will have an audible discontinuity at the connection point based on an amount of high-frequency energy in each of the two audio segment sequences and the combined sequence segment; and
   (c) if the SSC is determined to be of the correctable type and has an audible discontinuity at the connection point when rendered, correcting at least one uncorrected audio segment of the two audio segment sequences to be connected at the connection point, thereby generating at least one corrected audio segment.

2. The method of claim 1, wherein the SSC analyzed in step (b) is an SSC at a connection point between a first one of the segment sequences and a second one of the segment sequences, and step (c) includes a determination that the set of all specified seamless connections indicated by the connection metadata to or from the first one of the segment sequences or the second one of the segment sequences at the connection point consists of N specified seamless connections to the second one of the audio segment sequences at the connection point, that one of the N specified seamless connections is from the first one of the audio segment sequences to the second one of the audio segment sequences, and that at least one other one of the N specified seamless connections is from a third audio segment sequence to the second one of the audio segment sequences, and
   step (c) includes a step of correcting the last segment, $B_1$, of the first one of the audio segment sequences by replacing said segment $B_1$ with a corrected segment whose audio content is a crossfade from content of said segment $B_1$ to content of the first segment of the second one of the audio segment sequences, correcting the last segment, $B_2$, of the third audio segment sequence by replacing said segment $B_2$ with a second corrected segment whose audio content is a crossfade from content of said segment $B_2$ to content of the first segment of the second one of the audio segment sequences, and correcting the first segment, C, of the second one of the audio segment sequence by replacing said segment C with a third corrected segment whose audio content is a crossfade from content of the second segment of the second one of the audio segment sequences to content of said segment C.

3. The method of claim 1, wherein the SSC analyzed in step (b) is an SSC at a connection point between a first one of the segment sequences and a second one of the segment sequences, and step (c) includes a determination that the set of all specified seamless connections indicated by the connection metadata to or from the first one of the segment sequences or the second one of the segment sequences at the connection point consists of N specified seamless connections from the first one of the audio segment sequences at the connection point, that one of the N specified seamless connections is from the first one of the audio segment sequences to the second one of the audio segment sequences, and that at least one other one of the N specified seamless connections is from the first one of the audio segment sequences to a third audio segment sequence, and
   step (c) includes a step of correcting the first segment, $C_1$, of the second one of the audio segment sequences by replacing said segment $C_1$ with a corrected segment whose audio content is a crossfade, from content of a predicted version of segment $C_1$, which has been predicted from the last segment of the first one of the audio segment sequences, to content of said last segment of the first one of the audio segment sequences,
   correcting the first segment, $C_2$, of the third audio segment sequence by replacing said segment $C_2$ with a corrected segment whose audio content is a crossfade, from content of a predicted version of segment $C_2$, which has been predicted from the last segment of the first one of the audio segment sequences, to content of said last segment of the first one of the audio segment sequences,
   correcting the second segment, $D_1$, of the second one of the audio segment sequences by replacing said segment $D_1$ with a corrected segment whose audio content is a crossfade, from content of a predicted version of the first segment, $C_1$, of the second one of the audio segment sequences, which has been predicted from the last segment of the first one of the audio segment sequences, to content of said segment $D_1$, and correcting the second segment, $D_2$, of the third audio segment sequence by replacing said segment $D_2$ with a corrected segment whose audio content is a crossfade, from content of a predicted version of the first segment, $C_2$, of said third audio segment sequence, which has been predicted from the last segment of the first one of the audio segment sequences, to content of said segment $D_2$.

4. The method of claim 1, wherein the SSC analyzed in step (b) is an SSC at a connection point between a first one of the segment sequences and a second one of the segment sequences, and step (c) includes a determination that the set of all specified seamless connections indicated by the connection metadata to or from the first one of the segment sequences or the second one of the segment sequences at the connection point consists of N specified seamless connections from the first one of the audio segment sequences at the connection point, where one of the N specified seamless connections is from the first one of the audio segment sequences to the second one of the audio segment sequences, and at least one other one of the N specified seamless connections is from the first one of the audio segment sequences to a third audio segment sequence, and to determine that there is only one renderable version of each of the N specified seamless connections at the connection point, where the renderable version of the SSC to the second one of the segment sequences is to the first segment of said second one of the audio segment sequences, and the renderable version of the SSC to the third audio segment sequence is to the first segment of said third audio segment sequence, and step (c) includes a step of correcting the first segment, $C_1$, of the second one of the audio segment sequences by replacing said segment $C_1$ with a corrected segment whose audio content is a crossfade, from content of a predicted version of segment $C_1$, which has been predicted from the last segment of the first one of the audio segment sequences, to content of said segment $C_1$, and correcting the first segment, $C_2$, of the third audio segment sequence by replacing said segment $C_2$ with a corrected segment whose audio content is a crossfade, from content of a predicted version of segment $C_2$, which has been predicted from the last segment of the first one of the audio segment sequences, to content of said segment $C_2$.

5. The method of claim 1, wherein the SSC analyzed in step (b) is an SSC at a connection point between a first one of the segment sequences and a second one of the segment sequences, and step (c) includes a determination that the set of all specified seamless connections indicated by the connection metadata to or from the first one of the segment sequences or the second one of the segment sequences at the connection point consists of N specified seamless connections from the first one of the audio segment sequences at the connection point, where one of the N specified seamless connections is from the first one of the audio segment sequences to the second one of the audio segment sequences, and at least one other one of the N specified seamless connections is from the first one of the audio segment sequences to a third audio segment sequence, and to determine that there is only one renderable version of each of the N specified seamless connections at the connection point, where the renderable version of the SSC to the second one of the segment sequences is to the second segment of said second one of the audio segment sequences, and the renderable version of the SSC to the third audio segment sequence is to the second segment of said third audio segment sequence, and step (c) includes a step of correcting the second segment, $D_1$, of the second one of the audio segment sequences by replacing said segment $D_1$ with a corrected segment whose audio content is a crossfade, from content of a predicted version of the first segment, $C_1$, of the second one of the audio segment sequences, which has been predicted from the last segment of the first one of the audio segment sequences, to content of said segment $D_1$, and correcting the second segment, $D_2$, of the third audio segment sequence by replacing said segment $D_2$ with a corrected segment whose audio content is a crossfade, from content of a predicted version of the first segment, $C_2$, of said third audio segment sequence, which has been predicted from the last segment of the first one of the audio segment sequences, to content of said segment $D_2$.

6. The method of claim 1, wherein the SSC analyzed in step (b) is an SSC at a connection point between a first one of the segment sequences and a second one of the segment sequences, and step (c) includes a determination that the set of all specified seamless connections indicated by the connection metadata to or from the first one of the segment sequences or the second one of the segment sequences at the connection point consists of N specified seamless connections to the second one of the audio segment sequences at the connection point, where one of the N specified seamless connections is from the first one of the audio segment sequences to the second one of the audio segment sequences, and at least one other one of the N specified seamless connections is from a third audio segment sequence to the second one of the audio segment sequences, and to determine that there is only one renderable version of each of the N specified seamless connections at the connection point, where the renderable version of the SSC from the first one of the segment sequences is to the second segment of said second one of the audio segment sequences, and the renderable version of the SSC from the third audio segment sequence is to the second segment of said second one of the audio segment sequences, and step (c) includes a step of correcting the last segment, $B_1$, of the first one of the audio segment sequences by replacing said segment $B_1$ with a corrected segment whose audio content is a crossfade from content of said segment $B_1$ to content of the first segment of the second one of the audio segment sequences, correcting the last segment, $B_2$, of the third audio segment sequence by replacing said segment $B_2$ with a second corrected segment whose audio content is a crossfade from content of said segment $B_2$ to content of the first segment of the second one of the audio segment sequences.

7. The method of claim 1, wherein the SSC analyzed in step (b) is an SSC at a connection point between a first one of the segment sequences and a second one of the segment sequences, and step (c) includes a determination that the set of all specified seamless connections indicated by the connection metadata to or from the first one of the segment sequences or the second one of the segment sequences at the connection point consists of N specified seamless connections to the second one of the audio segment sequences at the connection point, where one of the N specified seamless connections is from the first one of the audio segment sequences to the second one of the audio segment sequences, and at least one other one of the N specified seamless connections is from a third audio segment sequence to the second one of the audio segment sequences, and to determine that there is only one renderable version of each of the N specified seamless connections at the connection point, where the renderable version of the SSC from the first one of the segment sequences is to the first segment of said second one of the audio segment sequences, and the renderable version of the SSC from the third audio segment sequence is to the first segment of said second one of the audio segment sequences, and step (c) includes a step of correcting the last segment, $B_1$, of the first one of the audio segment sequences by replacing said segment $B_1$ with a corrected segment whose audio content is a crossfade from content of said segment $B_1$ to content of a predicted version of segment $B_1$ which has been predicted backwards in time from the first segment of the second one of the audio segment sequences, and correcting the last segment, $B_2$, of the third audio segment sequence by replacing said segment $B_2$ with a corrected segment whose audio content is a crossfade from content of said segment $B_2$ to content of a predicted version of segment $B_2$ which has been predicted backwards in time from the first segment of the second one of the audio segment sequences.

8. A storage medium which stores, in non-transitory manner, data indicative of at least one corrected audio segment, wherein the corrected audio segment has been generated by of the method of claim 1.

9. The method of claim 1, wherein step (b) includes a step of using at least some of the connection metadata to analyze one said SSC at a connection point between a first one of the segment sequences and a second one of the segment sequences, to determine that rendering of the SSC at the connection point will necessarily result in a rendered version of the SSC in which the last segment of the first one of the segment sequences is connected to the first segment of the second one of the segment sequences, or will necessarily result in a rendered version of the SSC in which the last segment of the first one of the segment sequences is connected to the second segment of the second one of the segment sequences.

10. A system comprising:
a memory which stores, in non-transitory manner, data indicative of as set of audio segment sequences and connection metadata for each audio segment sequence in a subset of the set of audio segment sequences, where the connection metadata for said each audio segment sequence is indicative of at least one aspect, feature, or type of at least one connection to or from the audio segment sequence, relative to another one of the audio segment sequences, in a combined sequence which includes at least a portion of the audio segment sequence; and
a processing subsystem, coupled and configured:
to analyze at least one specified seamless connection ("SSC"), at a connection point between two of the audio segment sequences, of a plurality of SSCs specified by the connection metadata at the connection point, to determine whether the SSC is of a correctable type, and whether a rendered SSC will have an audible discontinuity at the connection point based on an amount of high-frequency energy in each of the two audio segment sequences and the combined sequence segment; and if the SSC is determined to be of the correctable type and has an audible discontinuity at the connection point when rendered, to correct at least one uncorrected audio segment of the two audio segment sequences to be connected at the connection point, thereby generating at least one corrected audio segment.

11. The system of claim 10, wherein the processing subsystem is configured to analyze an SSC at a connection point between a first one of the segment sequences and a second one of the segment sequences, including by determining that the set of all specified seamless connections indicated by the connection metadata to or from the first one of the segment sequences or the second one of the segment sequences at the connection point consists of N specified seamless connections to the second one of the audio segment sequences at the connection point, that one of the N specified seamless connections is from the first one of the audio segment sequences to the second one of the audio segment sequences, and that at least one other one of the N specified seamless connections is from a third audio segment sequence to the second one of the audio segment sequences, and to correct the last segment, $B_1$, of the first one of the audio segment sequences by replacing said segment $B_1$ with a corrected segment whose audio content is a crossfade from content of said segment $B_1$ to content of the first segment of the second one of the audio segment sequences, to correct the last segment, $B_2$, of the third audio segment sequence by replacing said segment $B_2$ with a second corrected segment whose audio content is a crossfade from content of said segment $B_2$ to content of the first segment of the second one of the audio segment sequences, and to correct the first segment, C, of the second one of the audio segment sequence by replacing said segment C with a third corrected segment whose audio content is a crossfade from content of the second segment of the second one of the audio segment sequences to content of said segment C.

12. The system of claim 10, wherein the processing subsystem is configured to analyze an SSC at a connection point between a first one of the segment sequences and a second one of the segment sequences, including by determining that the set of all specified seamless connections indicated by the connection metadata to or from the first one of the segment sequences or the second one of the segment sequences at the connection point consists of N specified seamless connections from the first one of the audio segment sequences at the connection point, that one of the N specified seamless connections is from the first one of the audio segment sequences to the second one of the audio segment sequences, and that at least one other one of the N specified seamless connections is from the first one of the audio segment sequences to a third audio segment sequence, and to correct the first segment, $C_1$, of the second one of the audio segment sequences by replacing said segment $C_1$ with a corrected segment whose audio content is a crossfade, from content of a predicted version of segment $C_1$, which has been predicted from the last segment of the first one of the audio segment sequences, to content of said last segment of the first one of the audio segment sequences, to correct the first segment, $C_2$, of the third audio segment sequence by replacing said segment $C_2$ with a corrected segment whose audio content is a crossfade, from content of a predicted version of segment $C_2$, which has been predicted from the last segment of the first one of the audio segment sequences, to content of said last segment of the first one of the audio segment sequences, to correct the second segment, $D_1$, of the second one of the audio segment sequences by replacing said segment $D_1$ with a corrected segment whose audio content is a crossfade, from content of a predicted version of the first segment, $C_1$, of the second one of the audio segment sequences, which has been predicted from the last segment of the first one of the audio segment sequences, to content of said segment $D_1$, and to correct the second segment, $D_2$, of the third audio segment sequence by replacing said segment $D_2$ with a corrected segment whose audio content is a crossfade, from content of a predicted version of the first segment, $C_2$, of said third audio segment sequence, which has been predicted from the last segment of the first one of the audio segment sequences, to content of said segment $D_2$.

13. A rendering system, including
a memory;
a processing subsystem, coupled to the memory and configured to render at least one combined sequence of audio segments, where the combined sequence includes at least one specified seamless connection between a first audio segment sequence and a second audio segment sequence, and where at least one of the first audio segment sequence and the second audio segment sequence includes at least one corrected audio segment, wherein the memory stores, in non-transitory manner, data indicative of the corrected audio segment, and wherein said corrected audio segment has been generated by a method comprising:

(a) providing data indicative of a set of audio segment sequences and connection metadata for each audio segment sequence in a subset of the set of audio segment sequences, where the connection metadata for said each audio segment sequence is indicative of at least one aspect, feature, and/or type of at least one connection to or from the audio segment sequence, relative to another one of the audio segment sequences, in a combined sequence which includes at least a portion of the audio segment sequence;

(b) analyzing at least one specified seamless connection ("SSC"), at a connection point between two of the audio segment sequences, of a plurality of SSCs specified by the connection metadata at the connection point, to determine whether the SSC is of a correctable type, and whether a rendered SSC will have an audible discontinuity at the connection point based on an amount of high-frequency energy in each of the two audio segment sequences and the combined sequence segment; and (c) if the SSC is determined to be of the correctable type and has an audible discontinuity at the connection point when rendered, correcting at least one uncorrected audio segment of the two audio segment sequences to be connected at the connection point, thereby generating at least one corrected audio segment.

14. The rendering system of claim 13, wherein the SSC analyzed in step (b) is an SSC at a connection point between a first one of the segment sequences and a second one of the segment sequences, and step (c) includes a determination that the set of all specified seamless connections indicated by the connection metadata to or from the first one of the segment sequences or the second one of the segment sequences at the connection point consists of N specified seamless connections to the second one of the audio segment sequences at the connection point, that one of the N specified seamless connections is from the first one of the audio segment sequences to the second one of the audio segment sequences, and that at least one other one of the N specified seamless connections is from a third audio segment sequence to the second one of the audio segment sequences, and step (c) includes a step of correcting the last segment, $B_1$, of the first one of the audio segment sequences by replacing said segment $B_1$ with a corrected segment whose audio content is a crossfade from content of said segment $B_1$ to content of the first segment of the second one of the audio segment sequences, correcting the last segment, $B_2$, of the third audio segment sequence by replacing said segment $B_2$ with a second corrected segment whose audio content is a crossfade from content of said segment $B_2$ to content of the first segment of the second one of the audio segment sequences, and correcting the first segment, C, of the second one of the audio segment sequence by replacing said segment C with a third corrected segment whose audio content is a crossfade from content of the second segment of the second one of the audio segment sequences to content of said segment C.

15. The rendering system of claim 13, wherein the SSC analyzed in step (b) is an SSC at a connection point between a first one of the segment sequences and a second one of the segment sequences, and step (c) includes a determination that the set of all specified seamless connections indicated by the connection metadata to or from the first one of the segment sequences or the second one of the segment sequences at the connection point consists of N specified seamless connections from the first one of the audio segment sequences at the connection point, that one of the N specified seamless connections is from the first one of the audio segment sequences to the second one of the audio segment sequences, and that at least one other one of the N specified seamless connections is from the first one of the audio segment sequences to a third audio segment sequence, and step (c) includes a step of correcting the first segment, $C_1$, of the second one of the audio segment sequences by replacing said segment $C_1$ with a corrected segment whose audio content is a crossfade, from content of a predicted version of segment $C_1$, which has been predicted from the last segment of the first one of the audio segment sequences, to content of said last segment of the first one of the audio segment sequences, correcting the first segment, $C_2$, of the third audio segment sequence by replacing said segment $C_2$ with a corrected segment whose audio content is a crossfade, from content of a predicted version of segment $C_2$, which has been predicted from the last segment of the first one of the audio segment sequences, to content of said last segment of the first one of the audio segment sequences, correcting the second segment, $D_1$, of the second one of the audio segment sequences by replacing said segment $D_1$ with a corrected segment whose audio content is a crossfade, from content of a predicted version of the first segment, $C_1$, of the second one of the audio segment sequences, which has been predicted from the last segment of the first one of the audio segment sequences, to content of said segment $D_1$, and correcting the second segment, $D_2$, of the third audio segment sequence by replacing said segment $D_2$ with a corrected segment whose audio content is a crossfade, from content of a predicted version of the first segment, $C_2$, of said third audio segment sequence, which has been predicted from the last segment of the first one of the audio segment sequences, to content of said segment $D_2$.

* * * * *